United States Patent [19]
Yamakawa et al.

[11] Patent Number: 5,809,366
[45] Date of Patent: Sep. 15, 1998

[54] METHOD AND SYSTEM FOR CALIBRATING A COLOR COPIER

[75] Inventors: Shinji Yamakawa; Kazuhisa Otsubo, both of Kawasaki, Japan

[73] Assignee: Ricoh Company, Ltd., Tokyo, Japan

[21] Appl. No.: 622,285

[22] Filed: Mar. 25, 1996

[30] Foreign Application Priority Data

| Mar. 24, 1995 | [JP] | Japan | 7-065461 |
| Mar. 27, 1995 | [JP] | Japan | 7-066630 |
| Mar. 31, 1995 | [JP] | Japan | 7-074857 |
| Mar. 31, 1995 | [JP] | Japan | 7-074858 |

[51] Int. Cl.$^6$ ............................................... G03G 15/01
[52] U.S. Cl. ........................................ 399/39; 358/519
[58] Field of Search ........................... 399/39, 40, 41, 399/184, 28; 358/519, 523, 527, 518

[56] References Cited

U.S. PATENT DOCUMENTS

| 5,081,529 | 1/1992 | Collette | 358/527 |
| 5,274,424 | 12/1993 | Hattori et al. | 399/49 |
| 5,343,282 | 8/1994 | Kazaki et al. | 358/461 |

OTHER PUBLICATIONS

Abstract of JP-A-06070147, published Jan. 5, 1994, From Derwent "World Patents Index".
Patent Abstracts of Japan, JP-A-57 133452, Aug. 18, 1982.
Patent Abstracts of Japan, JP-A-4 273650, Sep. 29, 1992.
Patent Abstracts of Japan, JP-A-2 25860, Jan. 29, 1990.
Patent Abstracts of Japan, JP-A-4 77060, Mar. 11, 1992.
Patent Abstracts of Japan, JP-A-63 303370, Dec. 9, 1988.
Patent Abstracts of Japan, JP-A-61 191168, Aug. 25, 1986.
Patent Abstracts of Japan, JP-A-2 76760, Mar. 16, 1990.
Dataquest Copier Guide, pp. v–ix and C–29, 1995, "Competitive Copier Guide", Ricoh NC–5006.
Ricoh NC–5006 Operating Instructions, Jul. 1994 (The whole book).

*Primary Examiner*—R. L. Moses
*Attorney, Agent, or Firm*—Oblon, Spivak, McClelland, Maier & Neustadt, P.C.

[57] ABSTRACT

A method and system for adjusting or calibrating the colors output by an image processing system such as a full-color digital copier. After the copier is calibrated, the color balance standard within the copier is set using the calibration information. A portion of the image is printed by the copier in various tones, adjusted relative to the color balance standard. The user then selects the color balance of the image having the most acceptable color balance. Calibration of the copier can be performed by scanning a gray-scale image and adjusting the parameters controlling RGB data within the copier based on the gray-scale image which was scanned. In order to adjust the color balance for specific colors contained within an image, the user manually selects points on the image and frames having the selected color are printed, scanned, and the scanned information compared to stored color information in order to adjust the color balance to accurately reproduce the color selected by the user. As an alternative manner of performing color balance adjustment for colors of a user selected image, points on the image are sampled and a mosaic-type image printed having the sampled points. The mosaic image which has been printed is then scanned in order to perform a color adjustment process.

50 Claims, 21 Drawing Sheets

METHOD AND SYSTEM FOR CALIBRATING A COLOR COPIER

RELATED APPLICATIONS

The present application claims priority to four Japanese Patent Applications 7-074858 filed Mar. 31, 1995, 7-074857, filed Mar. 31, 1995, 7-066630, filed Mar. 27, 1995, and 7-065461, filed Mar. 24, 1995, the disclosure of each is incorporated herein by reference.

BACKGROUND OF THE INVENTION

1. Field of the Invention

The present invention relates to an image processing apparatus such as a digital copy machine and the like for reading or inputting image data and printing or outputting the image data. The invention is more particularly related to a method of calibrating or adjusting the color balance of a color copier so that the colors of images which are scanned are accurately reproduced by a printing device.

2. Discussion of the Background

An image processing apparatus such as a digital copy machine and the like reads or inputs image data in order to print or reproduce the image data. This type of image processing apparatus includes, for example, an image scanner, a page memory, and a laser printer. The scanner reads or inputs image data which is temporarily stored in the page memory and prints or outputs the image data utilizing the laser printer.

An image processing apparatus capable of processing full-color image data reads full-color images and reproduces the full-color images on paper. However, since color reproducibility is deteriorated by age, heat, and other changing conditions, periodic adjustments of the color output of the full-color image processing apparatus is required. The adjustment of color reproducibility is called color calibration and disclosed in Japanese Patent Publication 4-273650, 2-25860, 4-77060, for example.

In the image processing apparatus disclosed in Japanese Patent Publication 4-273650, a full-color image is scanned, temporarily stored, and printed in full-color. Then the printed or output image is scanned, compared with the temporarily stored image data, and processing parameters of the copier are adjusted based on the results of the comparison.

In the image processing apparatus disclosed in Japanese Patent Publication Nos. 2-25860, 4-77060, and 4-273650, a reference document having a full-color test pattern is scanned and color processing is adjusted based on the scanned information which is input. Each of the above applications are incorporated herein by reference.

Each of the above-disclosed image processing apparatuses adjust the colors which are output by the image processing apparatuses. However, the present inventors have notices deficiencies in the known prior art systems. For example, when the user desires to manually set the color balance of a full-color copier, it is sometimes difficult to set the color balance exactly as desired. Further, most color copiers have scanners which send red, green, and blue image information and therefore, there is sometimes a difficult in accurately calibrating the gray or black toner output of the device. Further, when a user desires to accurately calibrate the copier with respect to a specific color, it may be difficult for the copier to calibrate with respect to that color when the color in an image which is used for calibrating is small in size. Further, when a user desires to calibrate a full-color copier with respect to a specific image containing many colors, it may be difficult to quickly and accurately calibrate the copier with respect to the many colors contained in a single image.

SUMMARY OF THE INVENTION

Accordingly, it is an object of the invention to provide a color balance selection method which allows a user to select the color balance relative to the calibrated standard of an image processing device.

It is another object of the invention to provide a color calibration method and system which reads a gray-scale pattern of varying tone and performs an automatic calibration process based on the gray-scale.

It is a further object of this invention to provide a color calibration system which calibrates a full-color image processing device to accurately reproduce colors contained in a specific image chosen by a user. It is yet another object of the invention to provide color calibration of a specific color within an image using either a frame of the generated color or alternatively by sampling colors within an image and printing color patches of the sampled colors.

These and other objects are accomplished by a method and system for calibrating a full-color image processing device such as a full-color digital color copier. In a first embodiment of the invention, an automatic calibration operation is first performed which sets a standard of the color copier machine. The user then scans a test image and the copier prints sample sheets which include a plurality of sections from the test image which have colors which are adjusted relative to this previously set standard. In addition to printing samples of varying colors, a sample is also printed which contains a color balance which is the same as the standard. The user then selects the most desirable color balance based on the printed sample sheets and subsequent images are printed by the color copier using the selected color balance.

A second embodiment of the invention performs the automatic calibration operation by printing a black toner pattern of varying density or intensity, such as 64 shades of black (also referred to as gray). The 64 tone pattern is then scanned and the color copier automatically adjusted so that the gray balance of copies are accurately generated. In order to control the gray balance, the RGB gamma compensation parameters are adjusted based on a comparison of the scanned gray scale and gray scale information which has been previously stored.

In a third embodiment of the invention, points within an image which are designated by a user are printed with frames which surround the selected point and have the same color as the selected point. The printed image is then scanned by the color copier and points on the frame are automatically read and analyzed. The points are compared with color information stored within the copier which were previously scanned and adjustments to the color processing operation made so that the colors corresponding to the user selected points are accurately calibrated.

In a fourth embodiment of the invention, colors of an image selected by a user are sampled after the image is scanned. The sampled colors are then printed, for example, in patch patterns. The colors of these patches may be selected by reading or sampling a specific point in small square regions (e.g. one square centimeter). The printed mosaic pattern is then scanned and the color processing parameters within the copier automatically adjusted so that the printed colors are the same as the colors which have been scanned. This allows colors within an image to be accurately produced, increases the signal-to-noise ratio by printing the colors in a size which is larger than might appear in the original image, and allows the color calibration to be performed so that actual colors within the image are accurately produced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
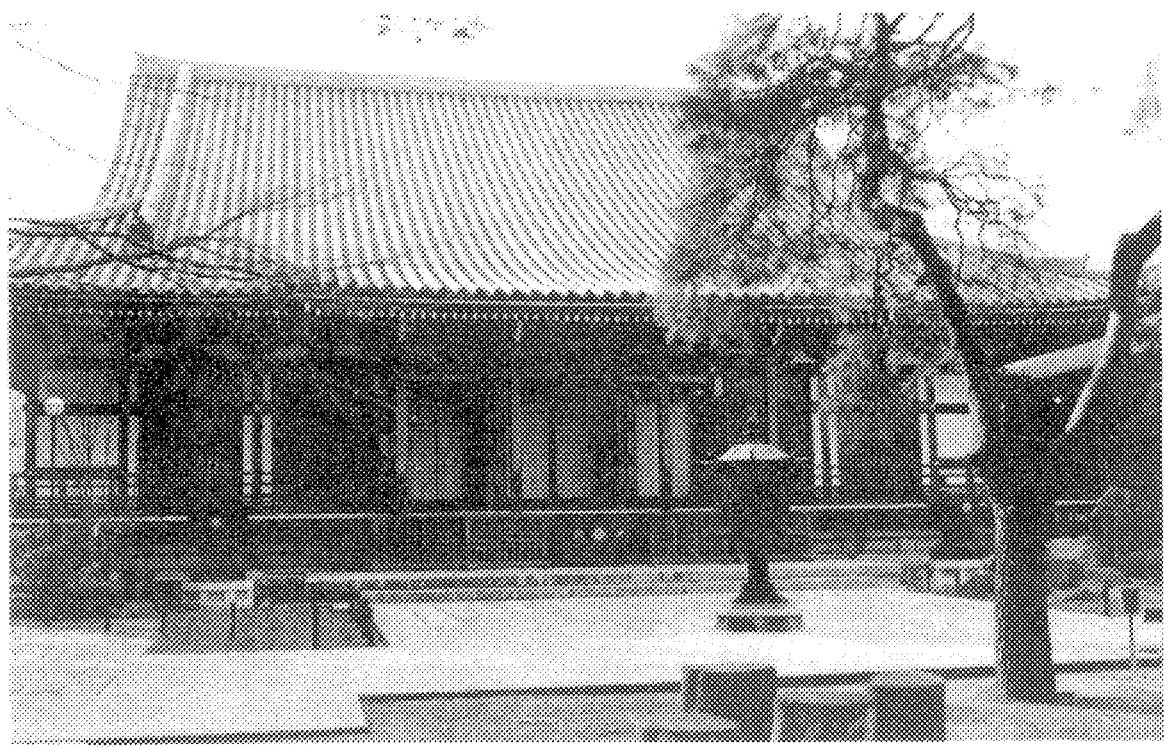
FIG. 1 is a photograph used during the calibration processes of the various embodiments of the invention.

Referring now to the drawings, wherein like reference numerals designate identical or corresponding parts throughout the several views, and more particularly to FIG. 1 thereof, there is illustrated a picture which is used to explain the various processes of adjusting the color output of an image forming apparatus. The present invention is applicable to image forming apparatuses such as full-color copier machines. The invention is also applicable to any device which receives color image information and prints for example, on paper, corresponding output images. The received image information may be obtained from a scanner which is either separate from the printing device or integral with the printing device or from a computer or other source of image information.

The images used to explain the operation of the invention were originally in color but are only illustrated in black and white including various shades of gray therein. However, the illustrated examples are still beneficial for explaining the processing of colors by the present invention.

Figure 2:
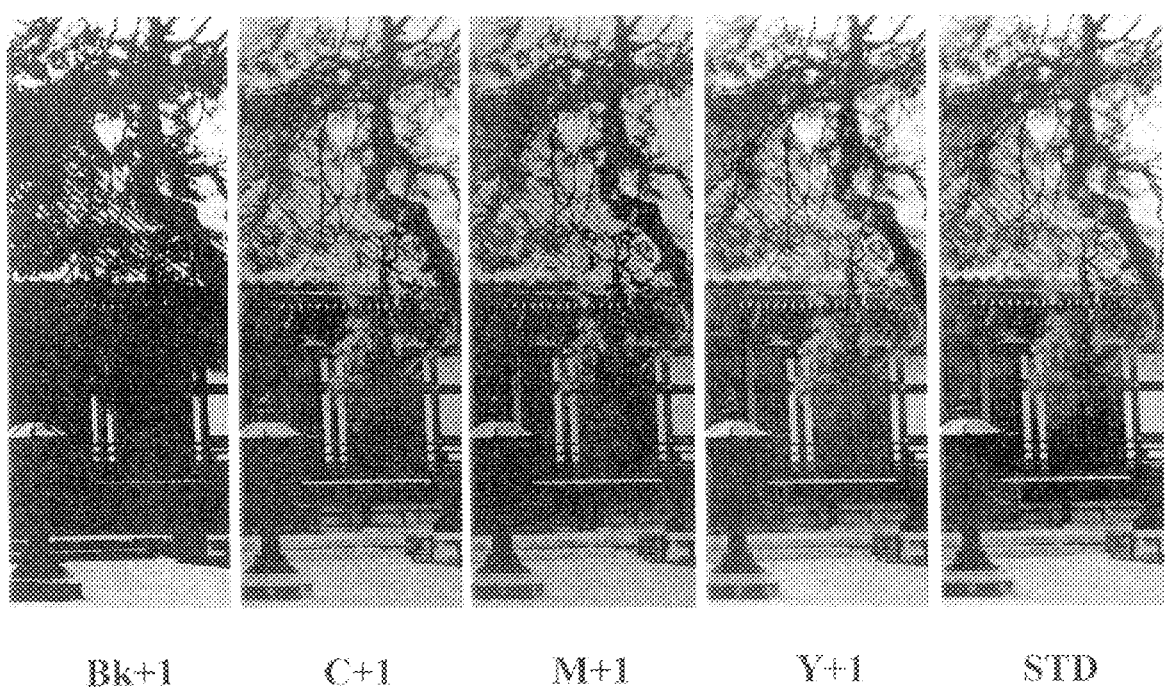
FIG. 2 illustrates an output from the full-color copier containing five images having different color balances from which a user selects the desired color balance.

According to a first embodiment of the invention, a color image, such as the image illustrated in FIG. 1 is scanned and stored in memory. Thereafter, when the user manually desires to adjust the color balance, a portion of the image in FIG. 1 is printed a plurality of times with varying color balances, as illustrated in FIG. 2. In FIG. 2, five equal sized portions of the image contained in FIG. 1 are printed using varying color densities, although the shades of color cannot be seen in the black and white picture, but this is not important to understanding the operation of the invention. In actual operation, the images would be color images.

The right-most image illustrated in FIG. 2 is the standard of the full-color image forming apparatus used to generate the images. This standard or current color default value of the image processing apparatus is set during a color calibration process which was previously performed. The standard which is printed is not affected by the manual settings of the various color components which are changed by a user and is not a permanently fixed standard of the image forming device but is a standard based on the current calibration of the color image forming apparatus which is preferably set through the automated calibration process. In addition to the standard illustrated on the right-most portion of FIG. 2, there are four other portions of images which have been printed which have been adjusted with respect to different colors. For example, the first image on the left side of FIG. 2 is the standard determined through the color calibration process with the black component increased by one unit. The exact meaning of this "unit" is not important but can be an arbitrary amount set by the manufacturer. As an example, the color copying may be set within a range of −4 to +4, the standard, STD, being zero. The three other sections of FIG. 2 include the cyan component increased by one, the magenta component increased by one, and the yellow component increased by one. As many exemplary patterns similar to the patterns illustrated in FIG. 2 can be generated, including the extreme ranges of each color component, color components which are indicated by red, green, or blue, and combinations of increases or decreases in any of the components making up the image, as desired.

After the user chooses the image which is most desired, subsequent images printed by the image forming apparatus will have the selected color balance. In order to make the selection of the different color balance options as simple as possible to the user, each section or portion of the image printed can be printed with an identifier such as a number or letter and when the user desires to select one of the portions of the image which has been printed, the user can simply indicate the number or letter corresponding to the desired image.

Figure 3:
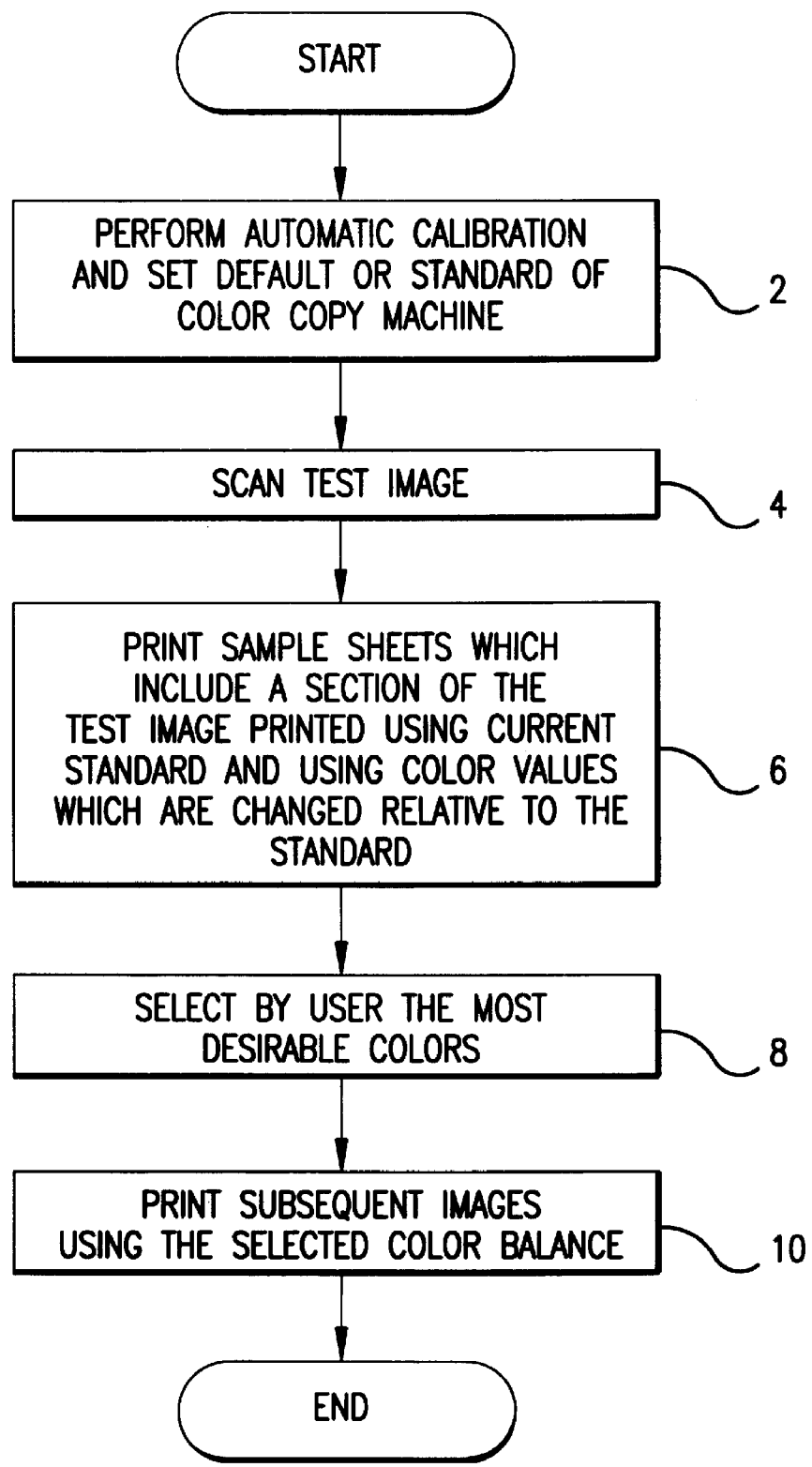
FIG. 3 illustrates a flowchart for manually adjusting the color balance of a full-color copier after the copier has been calibrated by having a user select one of a plurality of color balances shown in different images.

FIG. 3 illustrates a flow chart of a process used by the first embodiment of the invention. After starting, an automatic calibration operation is performed in step 2. This automatic calibration operation prints, for example, varying shades of yellow (Y), magenta (M), cyan (C), black (Bk), yellow and magenta (Y+M), yellow plus cyan (Y+C), magenta plus cyan (M+C), and a combination of yellow, magenta, and cyan (Y+M+C). In addition to the varying densities of these colors (e.g., varying intensities), various color patches are printed having varying shades of red, green, and blue. As an example, by varying the combinations of red, green and blue, 512 different patches are printed. After printing the varying color patterns (corresponding to the different color toners utilized by the printing section of the image forming apparatus) and the color patches, the user places the printed toner patterns and color patches on the scanner. These print-outs are then scanned and the image information which is obtained from the scanning process is compared with information stored in memory and an automatic calibration process of the image forming apparatus is performed in a known manner. Exemplary color calibration processes which can be performed by the present invention in step 2 of FIG. 1 include Japanese Patent Publication Application No. 57-133452, U.S. Pat. No. 4,959,669 to Haneda et al, and U.S. Pat. No. 4,962,421 issued to Murai. In addition to these known manner of calibrating the image forming device, any desired manner of calibrating the copier in order to set the standard (STD) may be utilized.

After performing the automatic calibration process in step 2, in step 4, a test image is scanned. For example, the color image corresponding to the picture of FIG. 1 is scanned into the image forming device and stored in a memory. Next, sample sheets similar to FIG. 2 are printed which include a section of the test image printed using the current color standard of the image forming device and have color values which are changed relative to the standard. As previously explained, this standard or default is set after a color calibration process is performed and is not dependent on the previously set manual color balance adjustments set by the user. After the images of varying color are printed, the user selects the most desirable arrangement in step 8. This information is input into the image forming apparatus and subsequent images which are printed are printed using the color settings corresponding to the selected image in step 10. The process of FIG. 3 then ends.

Figure 4:
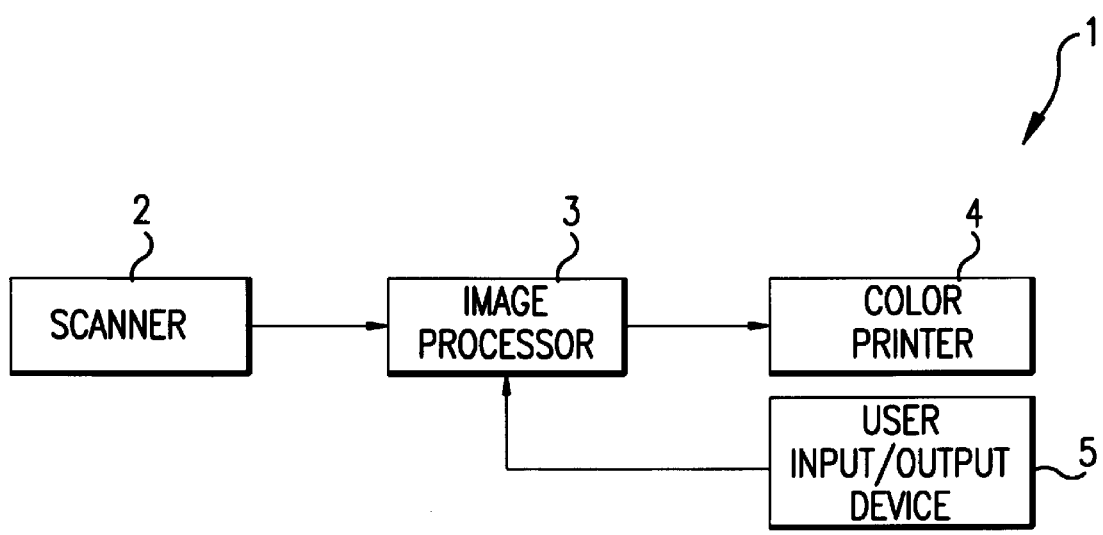
FIG. 4 is a block diagram of an image processing apparatus of the present invention.

An exemplary hardware block diagram of an image processing device 1 used by the various embodiments of the invention is illustrated in FIG. 4. The image processing device 1 is for example a digital copy machine which scans and prints in full color and includes a scanner 2, an image processor 3, a color printer 4, and a user input/output device 5.

The scanner 2 reads or inputs in full color, the image information of an image to be scanned. This image information is generated by three CCDs (charge coupled devices) within the scanner in order to generate RGB (Red, Green, and Blue) information, although other light sensor configurations are possible. The image processor 3, explained in detail below with respect to FIG. 5, temporarily stores image data and executes image processing to be discussed in detail later. The color printer 4 prints images information using for example, a laser printer technique, and utilizes cyan, magenta, yellow, and black toner. However, any type of color printer may be utilized with the invention, as desired. The user input/output device 5 receives commands from the user and displays information to the user. For example, the user may instruct the image processing device to perform an automatic calibration operation, copy operation, or to perform any process disclosed herein. Further, an image which has been scanned may be displayed on the user input/output device 5 which includes a liquid crystal display or CRT and the user has the ability to designate a specific region within the scanned image using a pointing device such as a mouse, joy stick, or in any other manner.

Figure 5:
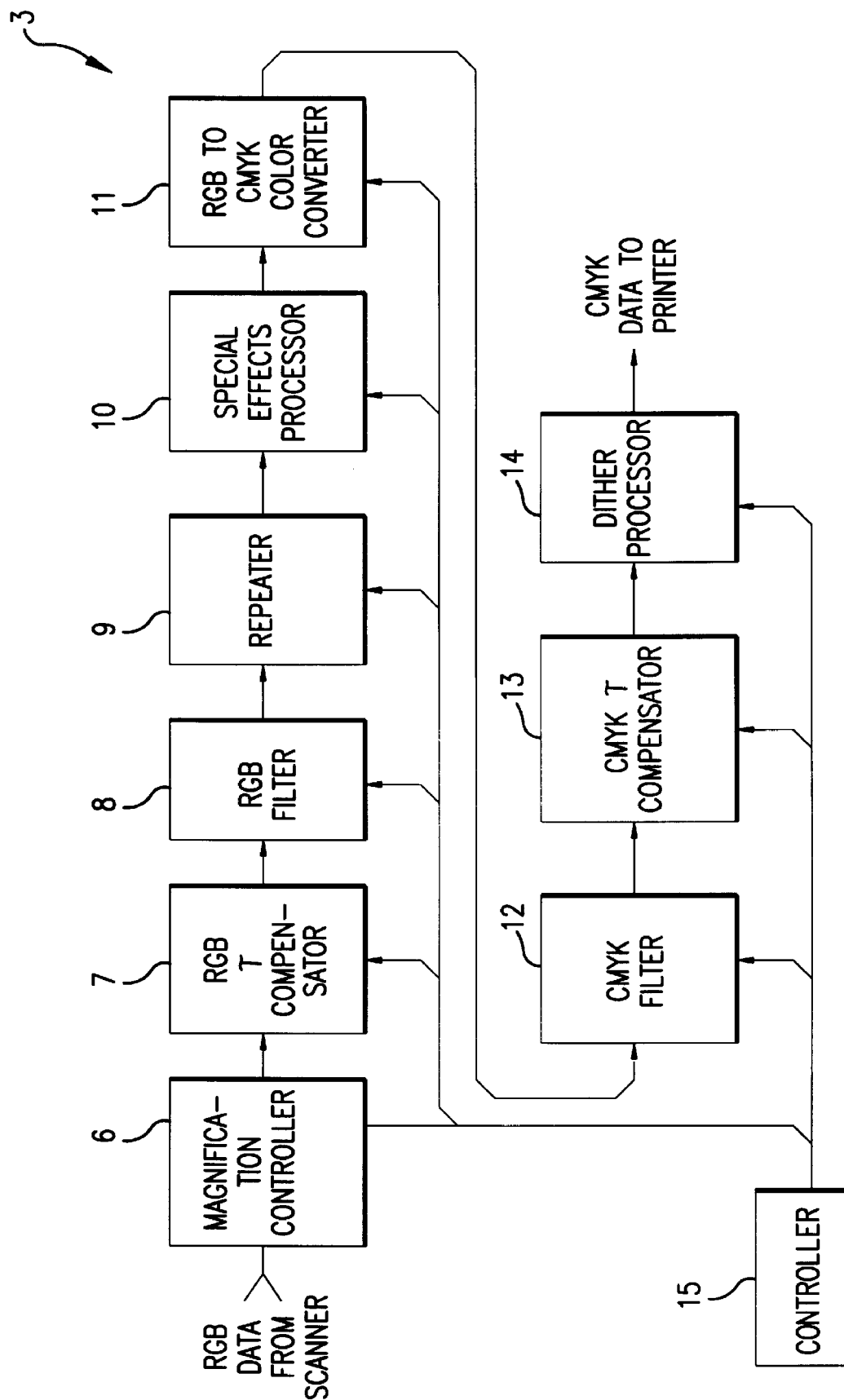
FIG. 5 illustrates a block diagram of the components contained within the image processor 3 illustrated in FIG. 4.

Details of the image processor 3 are illustrated in FIG. 5. In FIG. 5, RGB data from the scanner 2 is input into the magnification controller 6. The magnification controller 6 performs enlargement and reduction of the scanned image, as desired. The image information is sent from the magnification controller 6 to the RGB γ (gamma) compensator 7. This device adjusts the RGB data as necessary, in a known manner, in order to perform γ compensation on the RGB information. From the RGB γ compensator 7, the image data is transferred to the RGB filter 8 which performs edge emphasis and smoothing of the RGB data. For example, when an image is being processed, the transitional edges of the image information are smoothed in order to make the images appear better. When character information is being processed, the edges are sharpened or emphasized in order to make the characters clearer. This process is performed in a known manner.

From the RGB filter 8, the image data is transferred to the repeater 9. The repeater 9 is utilized, for example, to create the repeated images illustrated in FIG. 2. The image data is then transferred to the special effects processor 10 which allows special processing of the image such as converting the image into a mosaic format or performs paint processing which colors a portion of an image with the same color, as will be explained in the later embodiments. Next, the image data is transferred to the RGB to CMYK color converter 11 which transfers the image data from a Red, Green, Blue format to the equivalent representation using Cyan, Magenta, Yellow, and blacK.

The CMYK data is transferred to a CMYK filter 12 which performs edge emphasis and smoothing of the CMYK data. Next, the data is transferred to a CMYK γ compensator 13 which corrects the CMYK data in a known manner. The CMYK data is then transferred to a dither processor 14 which performs known dither processing in order to obtain varying shades of the toner images in a manner which is compatible with the printer. The CMYK data is then transferred to the printer.

The various elements illustrated in FIG. 5 are controlled by a controller 15 which may be implemented as a microprocessor controlled by software, for example, or special purpose circuitry. The RGB γ compensator 7 and RGB filter 8 perform functions which are related and correct the data input from the scanner and the CMYK filter 12 and CMYK γ compensator 13 perform functions on the CMYK data in order to create better printer output. The RGB to CMYK color converter 11 converts the data using a masking formula in a known manner. The user input/output device 5 illustrated in FIG. 4 is connected to the controller 15, for example.

Figure 6:
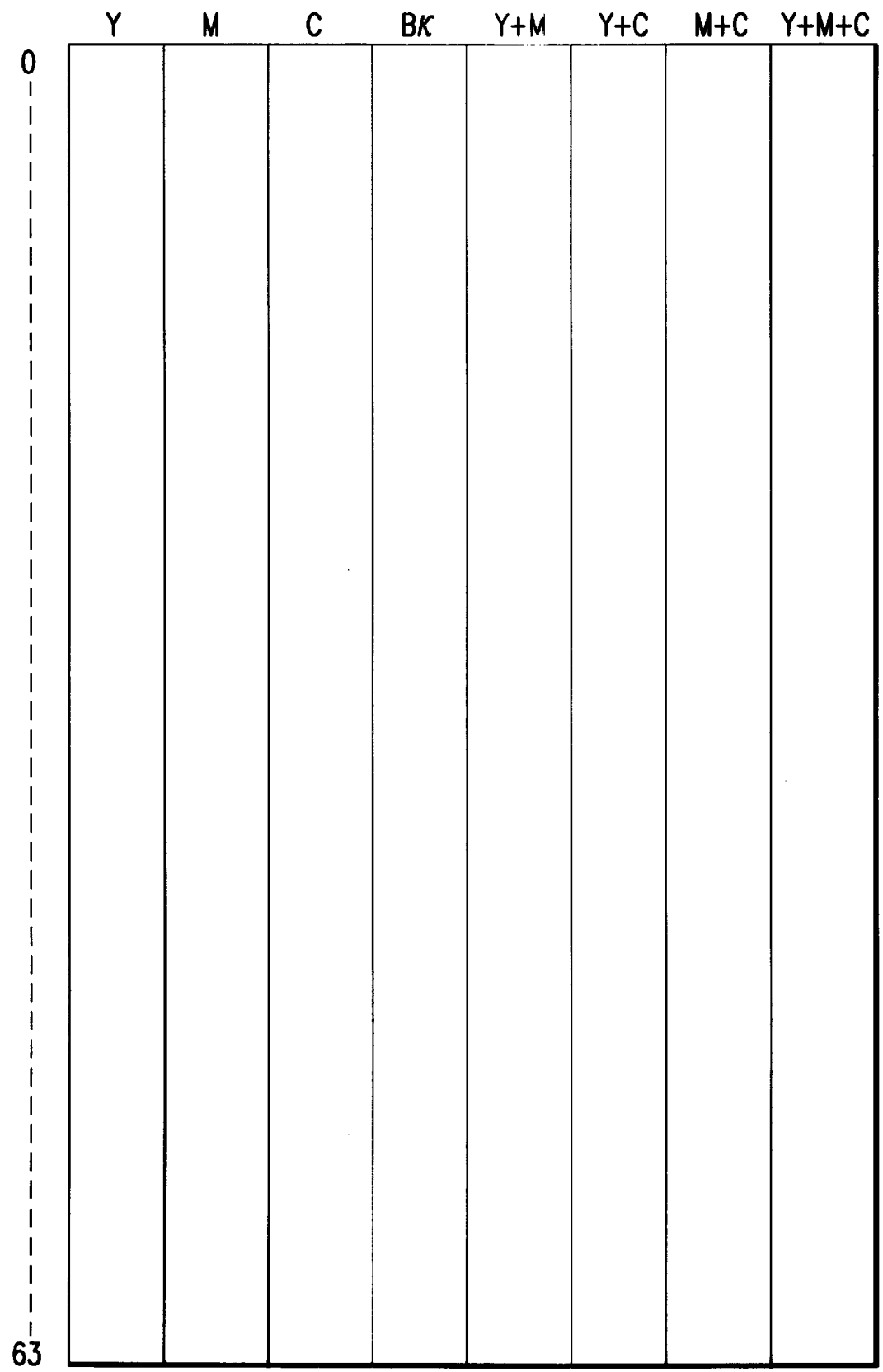
FIG. 6 illustrates varying density toner test patterns generated by a copier constructed according to the present invention in order to perform automatic calibration.

As explained with respect to step 2 of FIG. 3, the present invention performs an automatic calibration process in order to set the default or standard color parameters of the color copy machine. In order to perform this function, toner patterns including Y, M, C, and black toner (K) and combinations thereof are generated. For example, these toner patterns can vary in intensity between zero and 63, as illustrated in FIG. 6. The toner patterns illustrated in FIG. 6, while being exemplary in nature, have the minimum intensity at point zero, a maximum intensity at point 63 (the bottom of FIG. 6), and have a varying intensity in between. These varying intensity toner patterns are generated in a known manner, scanned, and used to calibrate the image forming device in a known manner.

Figure 7:
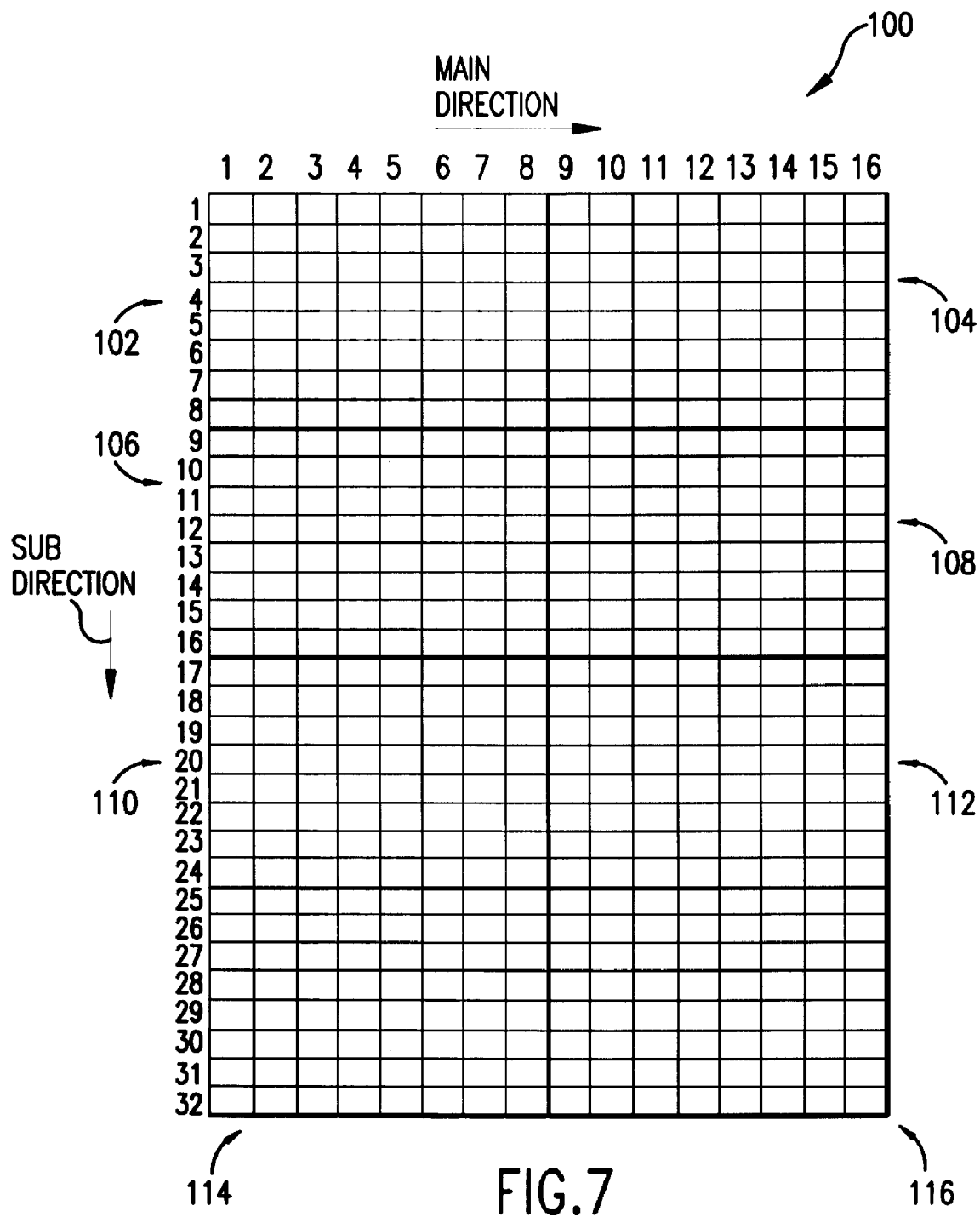
FIG. 7 illustrates a 16×32 array of varying color patches utilized to calibrate the image processing device of the present invention.
Figure 8:
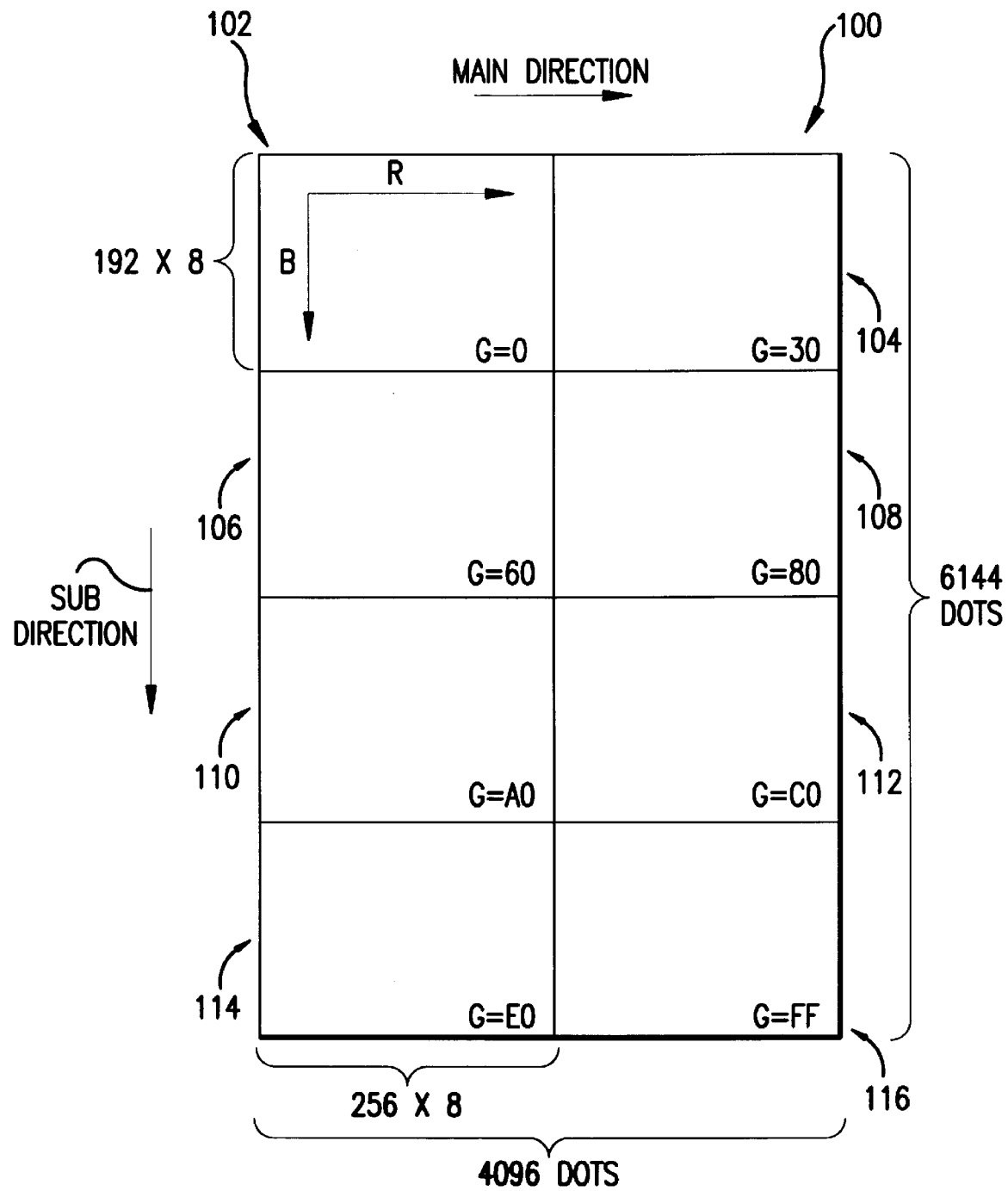
FIG. 8 illustrates how the color patches illustrated in FIG. 7 are divided into eight different sections.

In addition to the CMYK toner patterns illustrated in FIG. 6, RGB based calibration patch patterns are also preferably utilized in order to calibrate the image forming device. An example of an RGB based patch pattern is illustrated in FIG. 7. In this Figure, there are 16 columns by 32 rows or different color patches, for a total of 512 different color patches. As an exemplary manner of constructing the patches, the patch pattern 100 is divided into eight sections 102–116, each containing 64 patches. The eight sections are illustrated in FIG. 8. Section 102 has a minimum green value G=0, and the lower right-hand corner 116 has the maximum G value of FF hexadecimal which is 255 decimal. The numerical values used to generate the patches are all represented in hexadecimal. The other patch pattern sections 104, 106, 108, 110, 112, and 114 have varying degrees of green as illustrated. The red and blue patterns in each of these patches increases as the distance from the upper left-hand corner of the points decrease, as will be explained with respect to FIG. 9. The patch pattern 100 is 6144 dots in the sub-scanning direction and 4096 in the main scanning direction.

Figure 9:
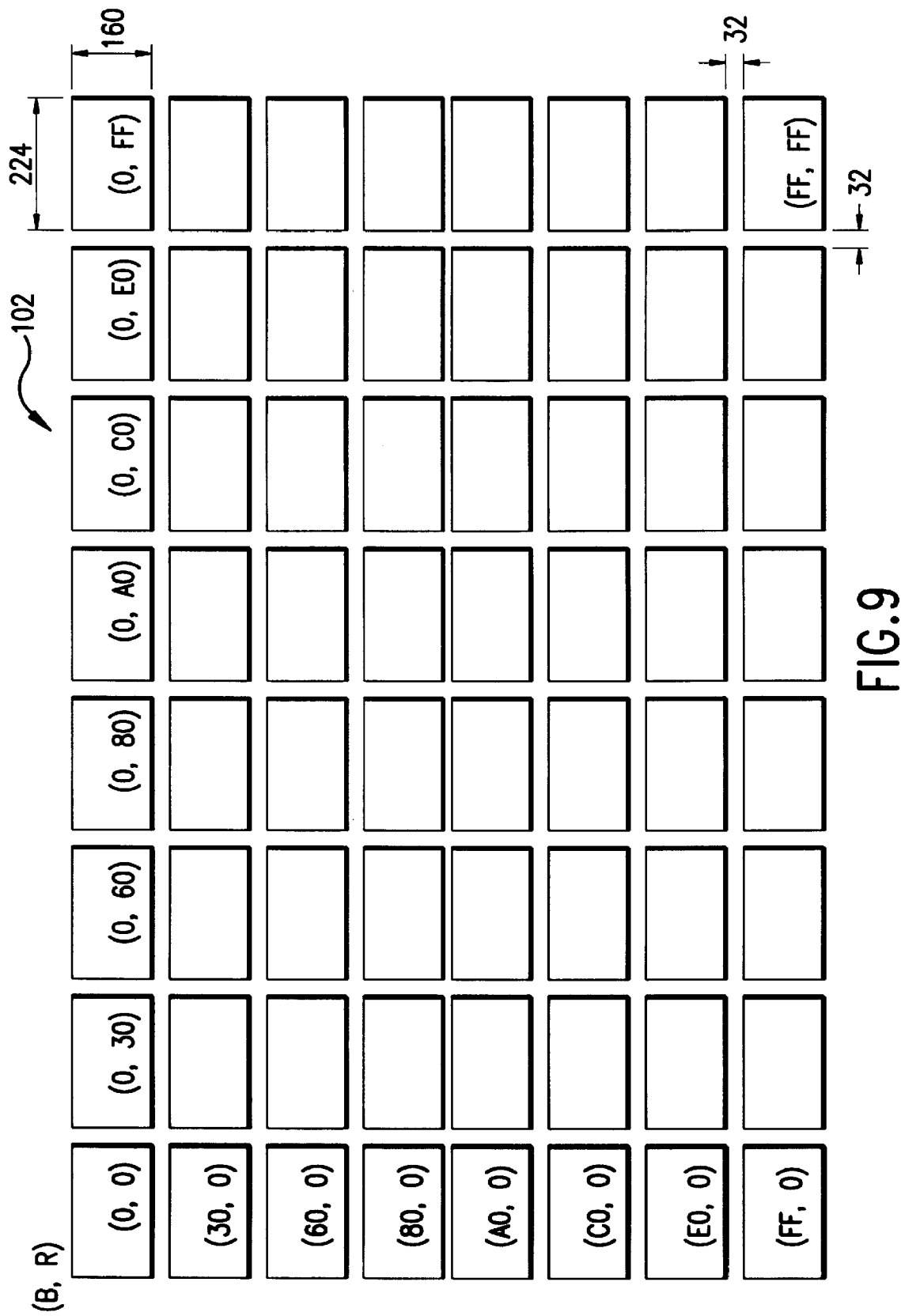
FIG. 9 illustrates an 8×8 array of color patches which are contained within the section 102 within the array illustrated in FIGS. 7 and 8.

FIG. 9 illustrates an exemplary region 102 from FIGS. 7 and 8. In FIG. 9, the blue and red intensities (B, R) are illustrated for the varying patches and the green value for each color patch in section 102 is zero. As illustrated in this Figure, there are 32 points or pixels separating each patch in both the horizontal and vertical direction and the width of each path (in the main scanning direction) is 224 pixels or points and in the sub-scanning direction 160 pixels or points.

After the patch pattern illustrated in FIG. 7 is generated by the printer, the user places this patch pattern on the scanner and it is scanned, stored and the image processor is automatically calibrated in a known manner by comparing the stored image data with previously determined color data.

After the automatic color calibration of the image processing device, an image is scanned and a section of the image is printed a plurality of times utilizing different color balances. This process has been explained with respect to the pictures illustrated in FIGS. 1 and 2 and will now be explained with respect to the non-picture examples illustrated in FIGS. 10–13.

Figure 10:
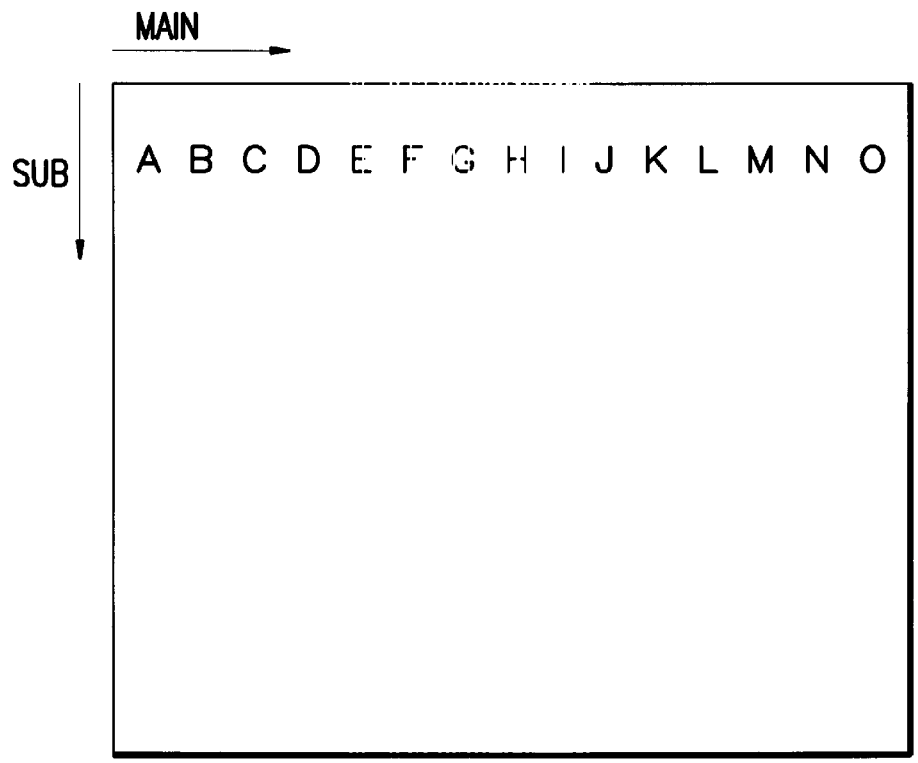
FIG. 10 is an exemplary image utilized to explain the operation of the invention.
Figure 11:
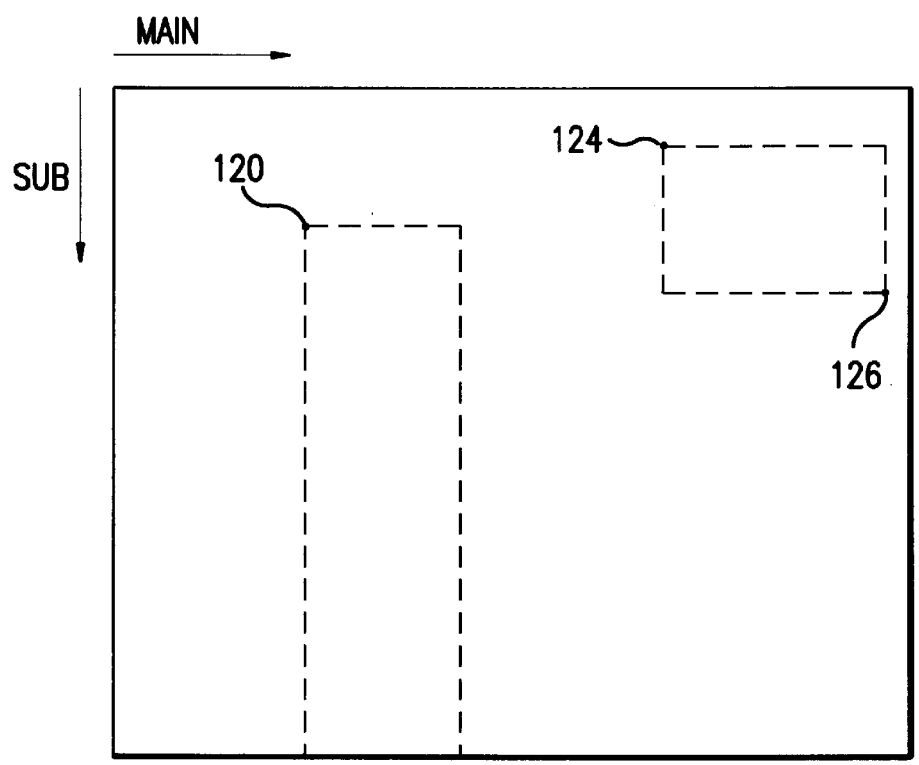
FIG. 11 illustrates a manner of selecting a portion of an image which is to be repeatedly output.

FIG. 10 illustrates an image which is to be scanned and printed a plurality of times with varying color balances. The letters A–O illustrated in FIG. 10 are merely used to label the position within the image of FIG. 10 and any image can be utilized by the present invention. The section of the image which is printed a plurality of times with different color balance parameters is either automatically selected by the image forming device or manually selected by a user. FIG. 11 illustrates two different methods of manually selecting a section. After the image is scanned, the image is displayed on the user input/output device 5 and the user selects a portion of the image to be repeated a plurality of times. The user may either select one point such as point 120 which then allows automatic selection of a region of the image as illustrated in FIG. 11. Alternatively, the user may select two points on opposite corners of a rectangle such as points 124 and 126. The region defined by these two points is then printed a plurality of times using the varying color balances. It is preferable for the image to be displayed while the user designates a region, although, it is also possible to have a region automatically selected without user intervention or to have a user select a region to be printed a plurality of times without viewing the image or the portion thereof when the selection is made.

Figure 12:
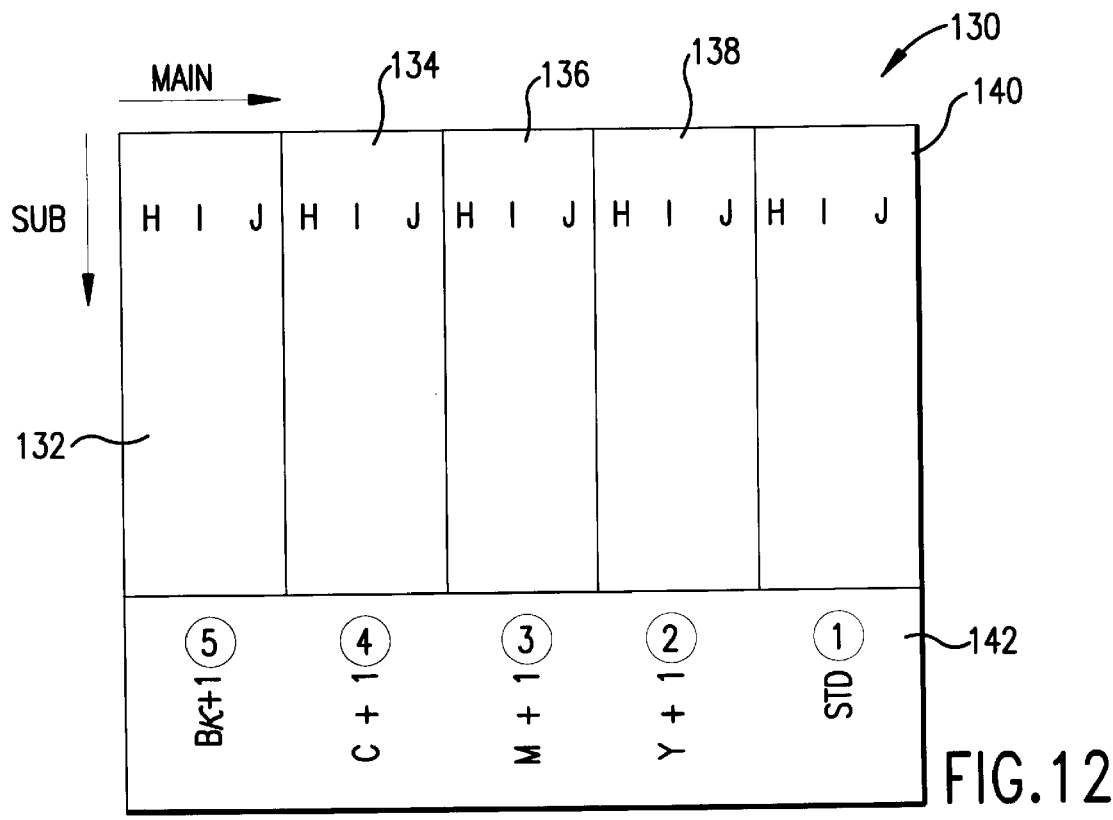
FIGS. 12 and 13 illustrate a portion of the image illustrated in FIG. 10 which is printed with different color balance so that the user can manually select the color balance of the image processing device.
Figure 13:
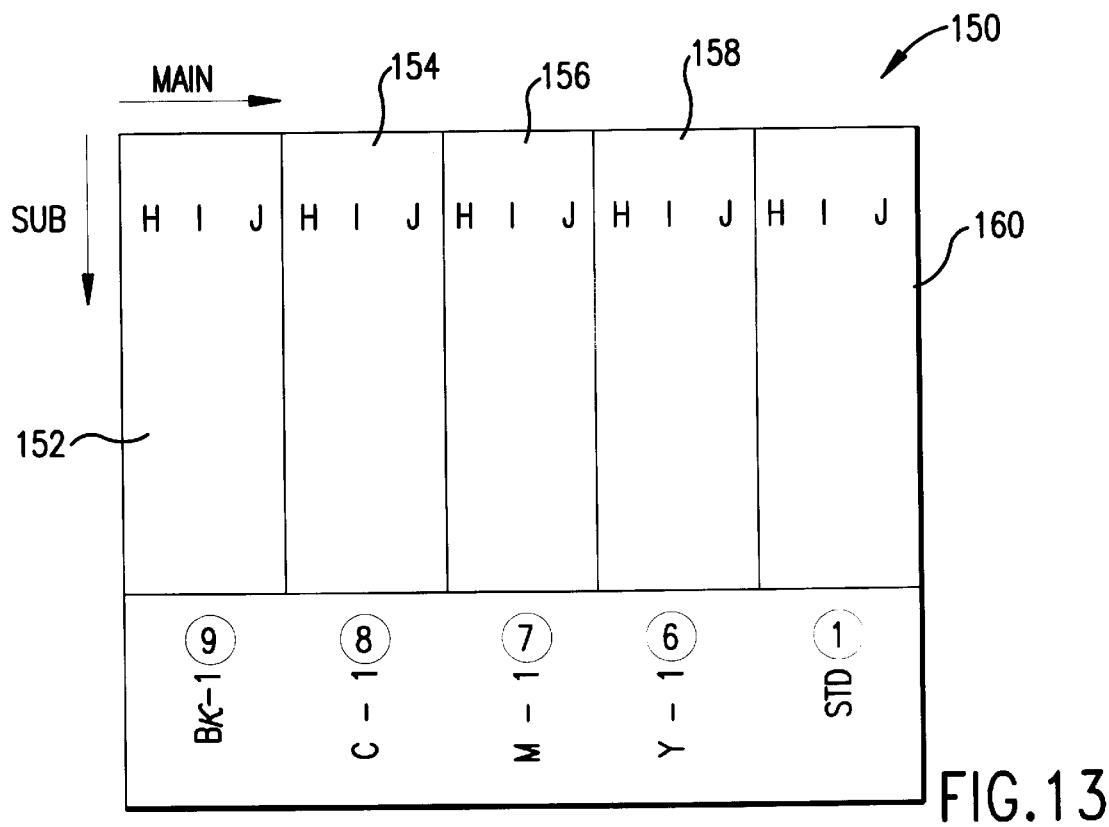

In FIGS 12 and 13, the section of the image which is repeatedly printed with different color balances is the section containing H, I, and J illustrated in FIG. 10. A color balance test image 130 is printed with five different color balances including a color balance 140 corresponding to the standard which was set from a color calibration process, and four other image sections 132, 134, 136, and 138 which have the colors black, cyan, magenta, and yellow respectively increased by one. FIG. 13 illustrates five color test patterns containing the standard 160 and color balance patterns 152, 150, 156, and 158 having the colors black, cyan, magenta, and yellow, respectively decreased by one. The standard STD which is printed is not affected by previous adjustments of the color balance by the user and is set by the color calibration process.

As can be seen in FIGS. 12 and 13, each of the color balance test patterns has a unique numerical identifier associated therewith. When the user sees a color balance which is desirable, the user may simply enter the number corresponding to the desired color balance after viewing the print-out of the color balance. While the various colors have been illustrated as being increased or decreased by one unit, the colors may be increased by more or less than one unit and more than one color may be adjusted in the color balance patterns.

One manner of increasing the colors is by increasing the γ curve of the CMYK γ correction. By allowing the user to select the color balance from generated print-outs such as those illustrated in FIGS. 12 or 13, complicated adjustment work by the user is unnecessary and the user is able to easily select many different types of varying or optimum color balances. The present invention has been illustrated to print the varying color balance patterns in equal sizes but the patterns can be printed in different sizes, if desired. As an alternative to scanning in the image such as the image illustrated in FIGS. 1 or 10, an image may be previously stored within the image forming device and printed in accordance with the teachings of the invention to have varying color balances without the need for the user to scan in the image. This prestored information may be as simple as toner patterns or toner patches of varying colors or may be an actual image such as the image illustrated in FIG. 1.

The alteration of the color balance has been described as varying the CMYK γ correction. However, a color correction index, for example parameters which control the RGB to CMYK color converter 11 are alternatively altered. As a further alternative, any parameter within the image forming device may be altered in order to create the varying color balance patterns including varying the RGB γ compensation parameters.

During the automatic calibration process, when the varying toner patterns or patches which are printed are scanned in a manner which is opposite to a desired scanning direction, the image processing device will detect a large deviation from an allowable range and a warning is output to request the user to correct the direction. When the error or deviation is large and out of range, the calibration or color balance processing can be cancelled if the problem is not corrected. Two images illustrated in FIGS. 12 and 13 have been illustrated for use in the color balance process, but more or less images can be printed on each sheet, as desired.

The second embodiment of the invention accurately adjusts the gray balance of the red-green-blue color data obtained by the scanner 2. In order to more fully appreciate the differences between the present invention and conventional gray balance adjustment operations, a description of a conventional system is set forth below.

In conventional image scanners and image processing devices, in order to scan or read image data in full color, for example, as RGB color, filters transparent to one of the RGB components are mounted in relation to CCDs (charge coupled devices). However, when the gray balance of the scanner fluctuates as these filters age and the CCDs age, reproducibility of full-color image data declines. In order to have the RGB input information accurately reflect the black or gray value of images which are scanned, conventional color scanners may include a gray scale base plate fixed to one edge of the contact glass typically in a position not readily viewable by a user. The gray scale base plate is scanned by moving the scanning mechanism to an end position and the obtained RGB data is compared to data previously stored. Based on the comparison, the gray balance of the image forming device is adjusted in order for the scanner or image forming device to accurately obtain or generate the gray scale information.

A disadvantage of this conventional system is that it is necessary to install this base plate with the contact glass and it is also necessary for the scanning mechanism to be able to move to the position of the base plate which is often not viewable to the user, thus preventing a decrease in size of the scanner and requiring additional parts or an extended range of movement of elements within the scanner.

Figure 14:
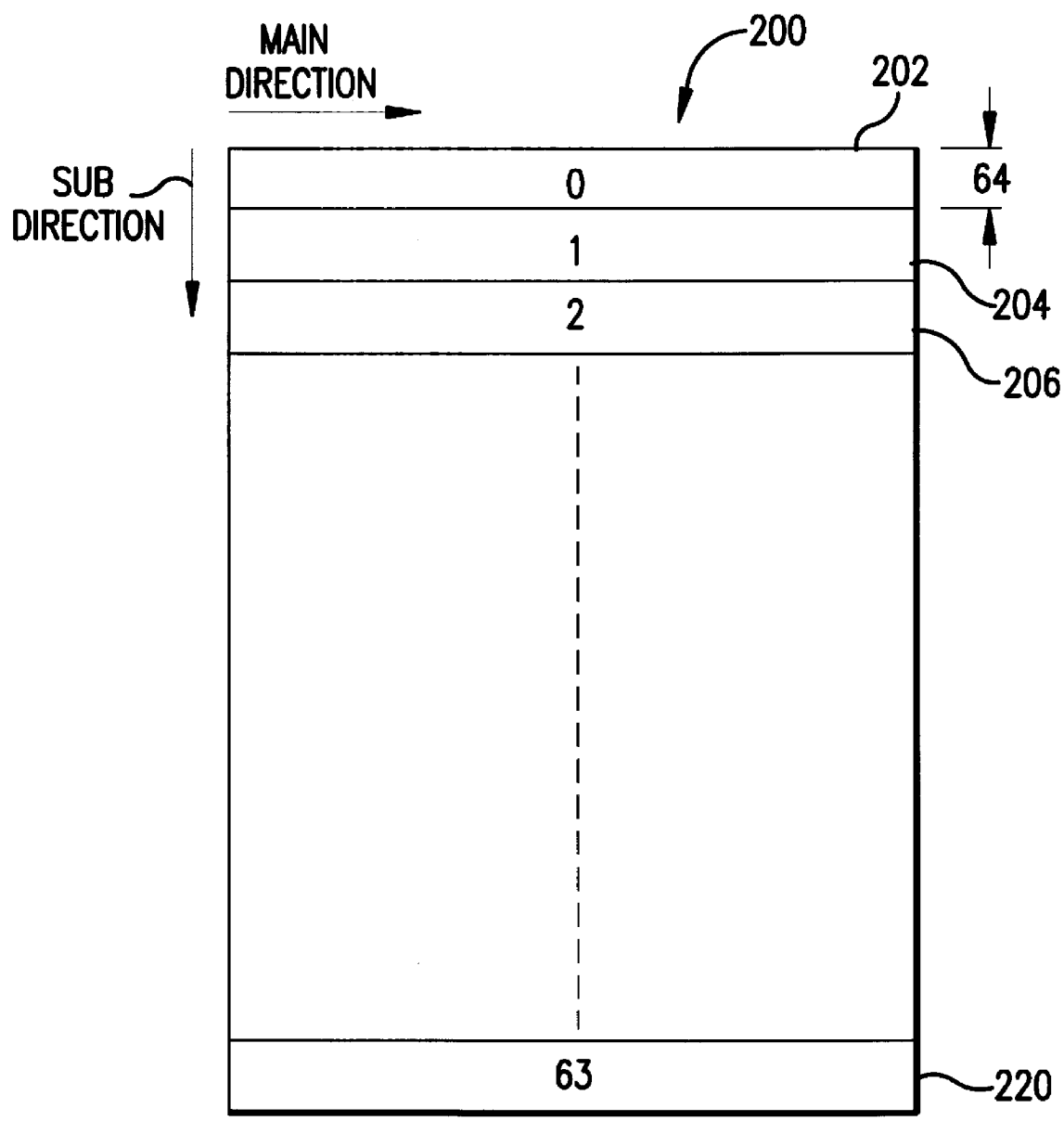
FIG. 14 illustrates a 64 tone single color test pattern used as a gray scale calibrator.

In contrast to the conventional system of adjusting gray balance where a base plate is mounted within the scanner, the present invention uses a sheet containing various densities of black for the gray balance calibration operation. For example, as illustrated in FIG. 14, a 64 tone or density, black or gray pattern is generated by the printer. This generated image 200 has a minimum density section 202 having a toner density of 0, and a maximum density section 220 with a density of 63. Toner density patterns between 0 and 63 gradually vary their toner density between the minimum and maximum densities. In the preferred embodiment, each of the 64 varying density toner patterns are 64 dots in height, also illustrated as being the sub-scanning direction.

The hardware used by the second embodiment of the invention is the same as the hardware used by the first embodiment which is illustrated in FIGS. 4 and 5. Note that as an alternative to printing a single black toner pattern of varying density as illustrated in FIG. 14, if desired, the black component which is used for the gray balance adjustment can be the black component which is generated in the varying color density pattern illustrated in FIG. 6.

Figure 15:
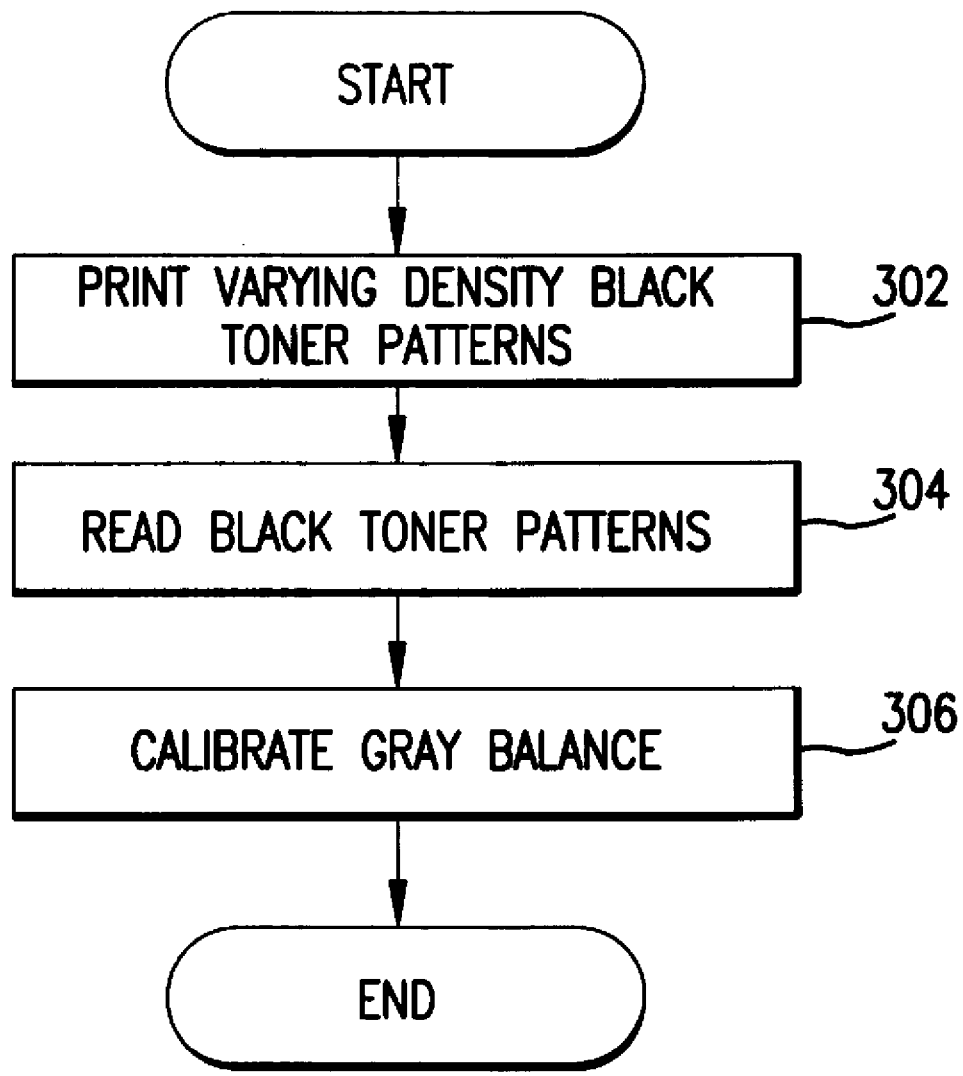
FIG. 15 illustrates a flowchart for performing a gray balance calibration operation.

A flowchart of the second embodiment of the invention is illustrated in FIG. 15. After starting, the varying density black toner pattern such as the toner pattern illustrated in FIG. 14 is printed. As an alternative to printing this toner pattern for each gray scale calibration operation, it is also possible to use a previously printed black toner pattern. After obtaining a varying density black toner pattern, this pattern is then read or scanned in step 304 by a scanner which outputs RGB color information. In this step, the user is required to place the black pattern on the scanner. This RGB color information is then stored. Next, the gray balance of the image processing device is calibrated by comparing the stored RGB data obtained in step 304 with previously stored data. This data can be a standard which is programmed at the place of manufacture of the scanner or image forming device. Based on a result of this comparison, a calibration process is performed which amends or corrects the RGB γ correction parameters used by the RGB γ compensator 7 illustrated in FIG. 5.

The above-described gray balance calibration operation is preferably performed in addition to the color balance operation which reads the color patches illustrated in FIG. 7 and the color balance operation which reads the varying density toner patterns illustrated in FIG. 6 which are utilized to adjust the CMYK γ compensation parameters, although this is not required.

The third embodiment of the invention allows the color output of the image processing device to be accurately calibrated using colors which have been selected by a user. Initially, an image selected by the user such as the image illustrated in FIG. 1 is scanned and stored in the image processor 3 illustrated in FIG. 4. The user then chooses specific points on the image which has been scanned which are desired to be used for calibration. For example, if the user chooses a point along the peak of the roof of the temple illustrated in FIG. 1, color calibration will be performed so that the color of that point which has been chosen will be accurately reproduced on sheets output by the printer.

In order to accurately perform the color calibration process using the selected point, the scanned image is printed to have a frame of color drawn around the selected point. As can be seen at the top left portion of FIG. 16, there is a frame drawn around a point on the peak of the roof. This frame has the same color as the point selected by the user which is the peak of the roof at the center of the frame. This printed image corresponding to FIG. 16 is then scanned by the scanner 2 of the image processing device 1 and an automatic calibration process is performed by comparing the color which has been scanned with color information of the point previously stored in memory.

The purpose of drawing the frame is that if the point having the color for which calibration is desired is small, it may be difficult to accurately perform calibration with respect to the color of this small point. By printing out a frame of the color, a larger sample will be used for the color calibration, thus increasing the signal to noise ratio of the color used for calibration. In FIG. 16, there is also a frame of color drawn at the center portion of this image along with a frame of color drawn at the base of the tree in the lower right-hand portion of the image. Therefore, in addition to calibrating with the color of the peak of the roof, calibration can also be performed to also accurately produce the color of a support pillar of the temple and the color of the bark of the tree trunk.

Figure 16:
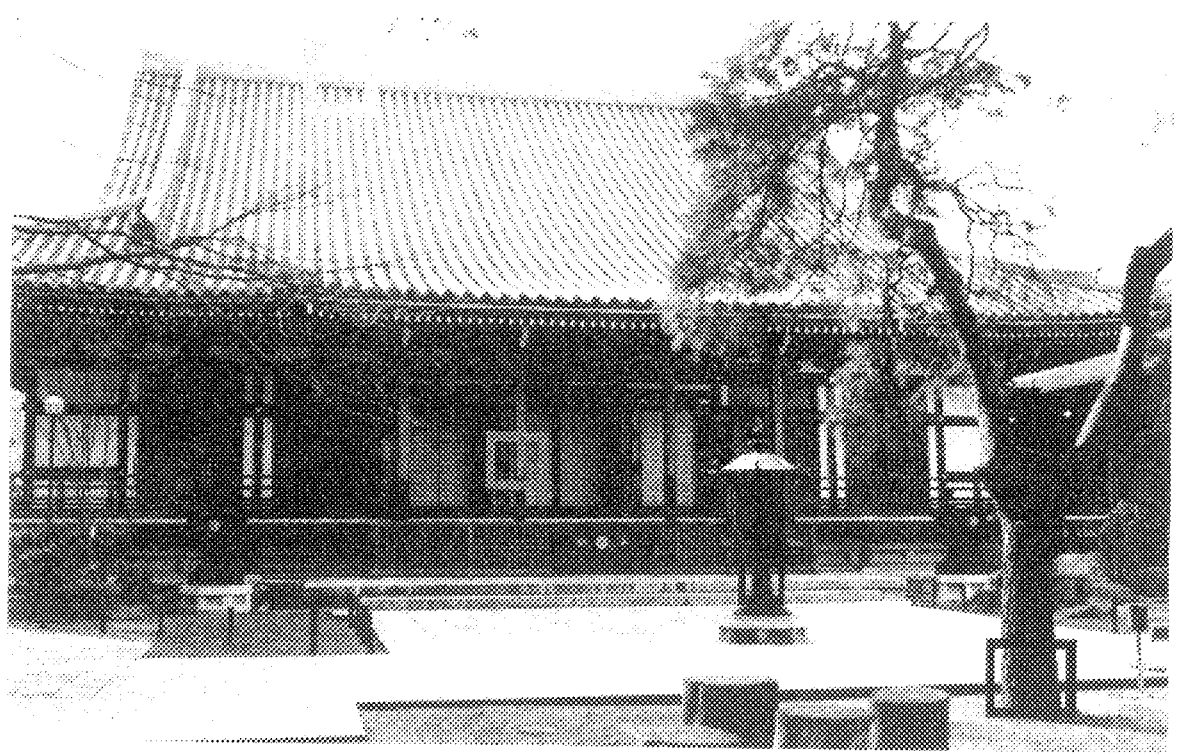
FIG. 16 is a picture containing frames of color used for a color calibration process.
Figure 17:
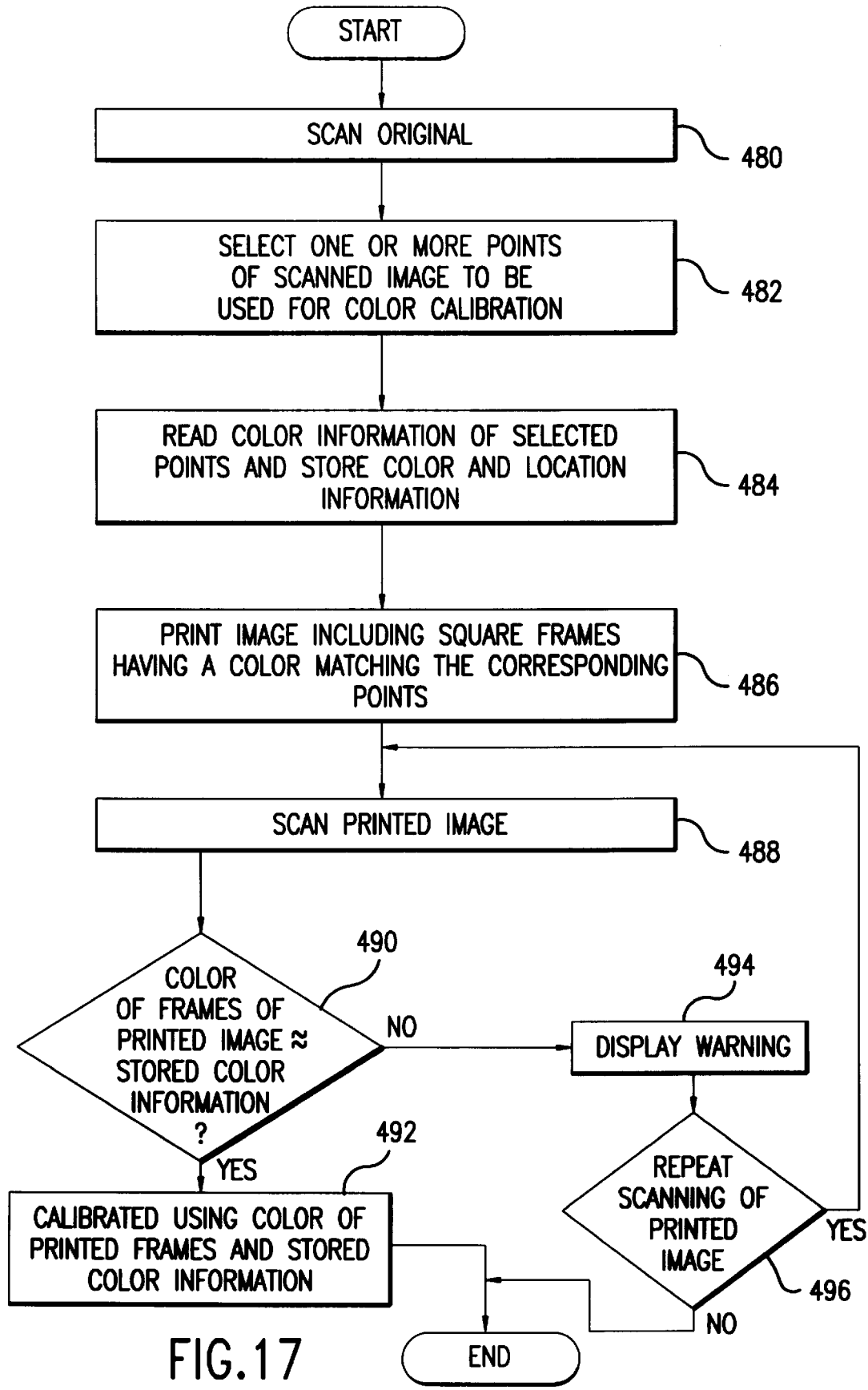
FIG. 17 is a flowchart illustrating the color calibration process utilizing the frames of color.

FIG. 17 illustrates a flowchart which performs color calibration on points of selected color by generating frames of the color, as illustrated in FIG. 16. In FIG. 17, after starting, step 480 scans an original image such as the image illustrated in FIG. 1. Using the user input/output device 5 illustrated in FIG. 4, the user selects one or more points of the scanned image to be used for the color calibration process in step 482. As an example of this step, the image which has been scanned is displayed on a color liquid crystal display or colored CRT to a user. Using a graphical pointing device such as a mouse or a joystick which is part of the user input/output device 5, the user selects specific points of the scanned image to be used for color calibration.

Step 484 then reads (e.g., from a buffer memory) the color information of the points selected by the user and stores both the color and location information of the selected points. Step 486 then prints an image such as the image illustrated in FIG. 16 including square frames around the selected points, each frame having a single color which is the same color as the selected point.

After the image has been printed, the user input/output device 5 instructs the user to place the printed image on the scanner and step 488 then scans the printed image, for example, the image illustrated in FIG. 16. After scanning, the image processor 3 determines if the color of frames of the printed image which has just been scanned is approximate to or close to the stored color information obtained after the original was scanned in step 480, the color information being stored in step 484. The purpose of step 490 is to make sure that when the image printed with square frames of color was properly aligned during the scanning process in step 488. If the color of the frames is completely different than the original color of the frames, it is probable that the scanning of the image having the printed frames was improperly performed because of misalignment of the printed image and flow proceeds to step 494 which displays a warning to the user on the user input/output device 5, indicating the probability of improper scanning. In step 496, the user is asked if it is desired to repeat the scanning of the printed image and if the user indicates a desire to rescan the printed image, flow proceeds back to step 488. Alternatively, if the user does not desire to repeat the scanning in step 496, the process of FIG. 17 ends.

If step 490 determines that the color of the printed frames is similar to or approximate to the stored color information, flow proceeds from step 490 to step 492 which performs a color calibration process by comparing the printed colors of the frames which were scanned in step 488 with the original color information stored in step 484. This color calibration process can be performed using any desired calibration process including known calibration processes. For example, it is conventional in the art to print patches of color, and then to scan those printed patches in order to perform a color calibration. This type of conventional color calibration can be performed in step 492. After the calibration is performed in step 492, the process of FIG. 17 ends.

Figure 18:
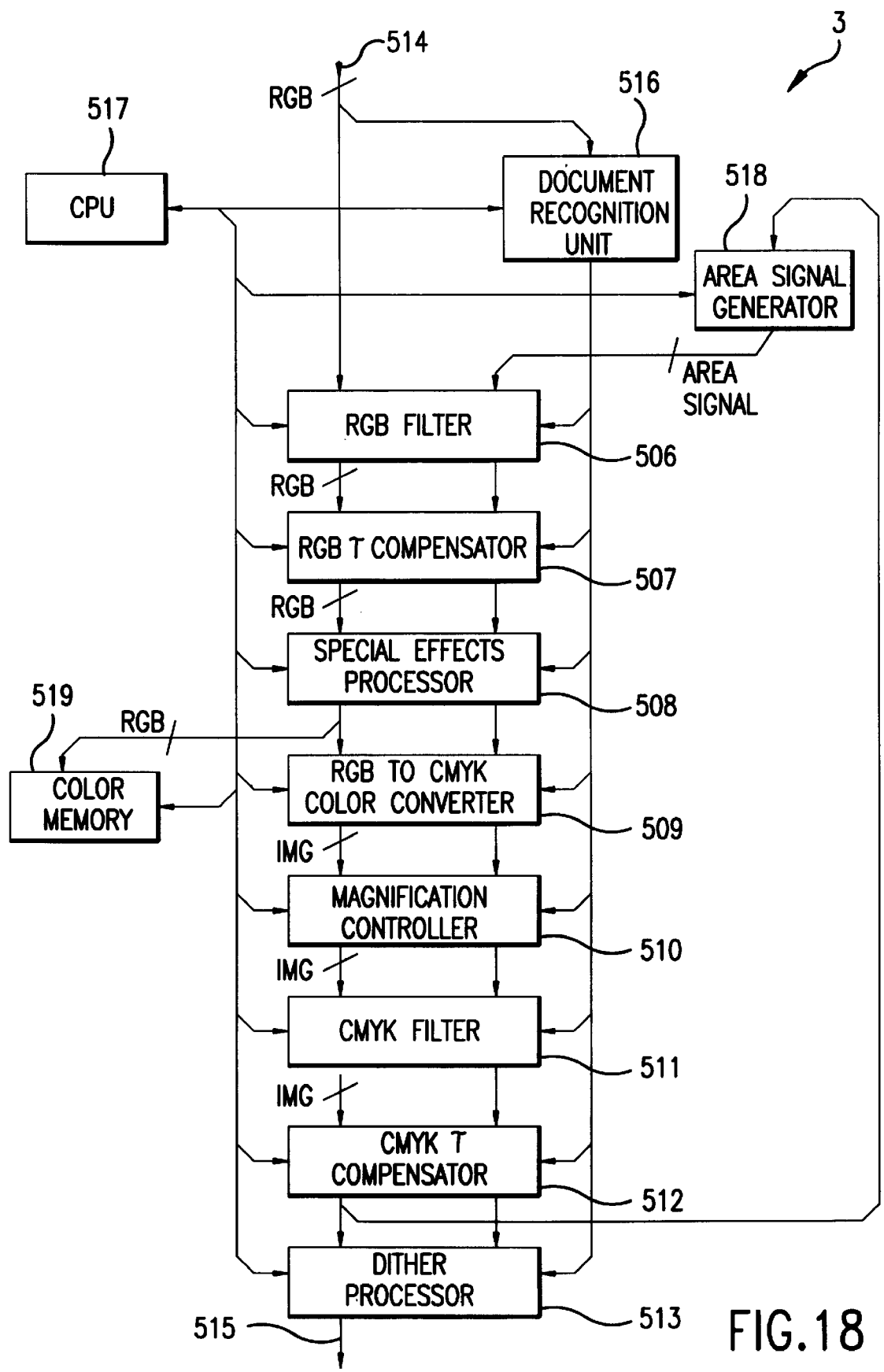
FIG. 18 is a block diagram of the hardware components of the image processor 3 illustrated in FIG. 4 and is an alternative embodiment to the block diagram of FIG. 5.

FIG. 18 illustrates a block diagram of the image processor 3 illustrated in FIG. 4 utilized by the third embodiment of the invention and is an alternative to the block diagram illustrated in FIG. 5. The elements illustrated in FIG. 18 which have the same name as the elements illustrated in FIG. 5 perform the same or similar functions as the elements illustrated in FIG. 5. RGB image data from the scanner 2 is input to the image processor 3 at the input point 514. CMYK output data is output from the dither processor 513 at point 515 to the color printer 4. The user input/output device 5 illustrated in FIG. 4 is connected to the CPU 517 and/or the area signal generator 518. The RGB filter 506 carries out a sharpening process by a 3×5 filter to subject the RGB data to MTF correction. Further, when a document is a printed matter or a copy, the RGB data is subject to a smoothing process. The RGB $\gamma$ compensator 507 subjects the RGB data to $\gamma$ correction through a look-up table and converts it into density data. The special effects processor subjects the image data to various image processings such as paint processing utilized to generate the frames of color, undercolor processing utilized to obtain a black component utilized for printing black portions of the image using black toner within the printer 4, and mosaic processing, explained below with respect to the fourth embodiment of the invention. The RGB to CMYK color converter 509 converts the RGB data into CMYK data by a linear masking equation. An example of such and equation is set forth below:

$$\begin{pmatrix} Yi \\ Mi \\ Ci \\ Bk \end{pmatrix} = \begin{pmatrix} a_{11} & a_{12} & a_{13} \\ a_{21} & a_{22} & a_{23} \\ a_{31} & a_{32} & a_{33} \\ a_{41} & a_{42} & a_{43} \end{pmatrix} \begin{pmatrix} B \\ G \\ R \end{pmatrix} \quad (1)$$

The CMY components are then determined according to the equation below:

$$\begin{cases} Y = \alpha_1 Yi - \beta_1 Bk \\ M = \alpha_2 Mi - \beta_2 Bk \\ C = \alpha_3 Ci - \beta_3 Bk \end{cases} \quad (2)$$

The manner of obtaining this color information is conventional and any alternative process can be used to determined the color information. The parameters within the color masking equations can be determined through routine experimentation and are known in the art.

The magnification controller 510 changes the magnification of the image data in a main scanning direction and performs movement processing of the image data to a desired position in the main scanning direction. Note that the magnification adjustment of the image data in a sub-scanning direction is executed by the scanner 2 and color printer 4.

The CMYK filter 511 subjects the CMYK data to sharpening processing and smoothing processing so that the CMYK data has characteristics suitable for printing and gradation or dither processing. The CMYK $\gamma$ compensator 512 subjects the CMYK data to $\gamma$ correction through a look-up table so that it has characteristics suitable for printing. The dither processor 513 subjects the CMYK data to intermediate gradation processing by a 1×2 multi-value dither method or the like in a conventional manner so that the data has characteristics suitable for printing.

The image processor 3 includes a document recognition unit 516 which is connected to the input 514 and is also connected to the other elements of FIG. 18 as illustrated. The document recognition unit 516 determines a type of the document (paper size, image characteristics such as whether the image is printed characters or an image or both) and outputs to the respective elements in FIG. 18 a notification of the type of data which is input from the scanner. Although the elements in FIG. 18 adjust or correct their processing operation in accordance with the type of the document, the elements are capable of executing the appropriate processing, even if the document type information is not available.

Also illustrated in FIG. 18 is a CPU (central processing unit) 517 which may be implemented as a general purpose microprocessor, control board, or special purpose circuitry or integrated circuits. The CPU 517 functions to control each of the elements illustrated in FIG. 18.

There is an area signal generator 518 connected to the CPU 517 and to the various processing elements in FIG. 18 through the RGB filter 506. The area signal generator 518 includes a bitmap memory (not illustrated) and when the desired positions of image data is input by the user input/output device 5, the coordinates of these positions are stored in the bitmap memory therein. Not only is the region of the individual point which has been selected by the user stored within the area signal generator 518, but also the location of the frame color is also stored in the area signal generator. The information defining the location of the frame may be stored as an area or region signal or in any desired format to indicate the selected point in he area of the frame of color. The area signal generator 518 can also be used by the fourth embodiment of the invention to designate a specific area to be used for mosaic processing described in the fourth embodiment of the invention. The CMYK γ compensator 512 feeds back to the area signal generator 518 information regarding the frames which have been printed.

The color memory 519 stores RGB color data of the selected positions used for frame processing. The present embodiment uses, as an example, the processing of three different color frames but any number of frames of color can be used, as desired. Additionally, the color memory 519 can be used to store color information of blocks of color within the mosaic generated by the fourth embodiment of the invention.

During operation of the third embodiment of the invention which prints out frames of selected color, an image comparison function is performed which compares the frames of image data which have been printed with the points which have been selected by the user. The RGB color information read from the printed frames of color is utilized in order to adjust the color processing conditions of the image processor 3. More specifically, the CPU 517 adjusts the parameters of the processing operation of the elements illustrated in FIG. 18 according to the results of the comparison of the RGB data to cause the read or scanned input color to coincide with the printed or output color at the desired portions.

The special effects processor 518 performs a paint operation to generate the frames of color in order to improve the S/N (signal-to-noise ratio) of the image data which is printed. A color discrimination operation is performed which discriminates the colors of the image data read or input from the document of the desired position and the painting operation is performed in order to paint the frames of image corresponding to the selected color. The present invention is particularly applicable to the setting of the color balance in order to be adjusted to properly coincide with the color selected by the user.

Figure 19:
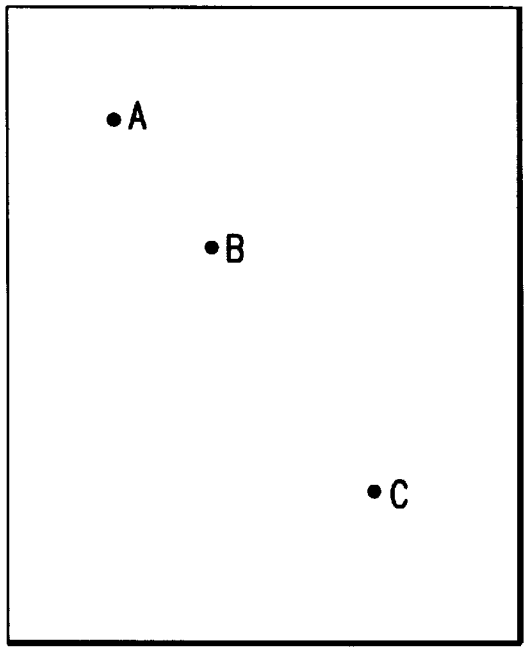
FIG. 19 illustrates three points of an image which have been selected for use during the color balancing operation.
Figure 20:
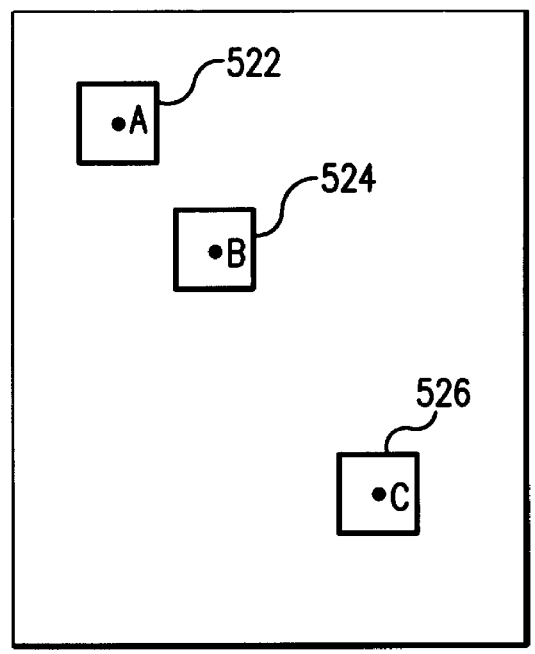
FIG. 20 illustrates frames drawn around the three selected points of FIG. 19 which have the same color as the point therein.

An example has been previously explained with respect to the frames illustrated in FIG. 16. However, another example will be explained without the use of an actual image utilizing FIGS. 19–21. As illustrated in FIG. 19, the user has selected three points A, B and C on an image which has been scanned. In FIG. 20, a printout is illustrated which contains frames 522, 524, and 526, respectively surrounding points A, B and C. As an alternative to printing the entire image along with the frames as illustrated in FIG. 16, if desired, only the frames of the color data or the frames including the selected point of color are printed without all of the other portions of the image, for which color information is not needed to perform color balance adjustment. The points A, B and C illustrated in FIG. 19 have been described as being selected by a graphical pointing device but alternatively, the user can enter coordinate information defining the location of these points.

When only the frames of color and the point therein are printed without all of the other portions of the image, or even when the entire image is printed along with the frame, the coordinates for paint processing utilized to generate the frames are set in the bitmap memory of the area signal generator 518 which notifies the respective elements illustrated in FIG. 18 of the areas for which paint processing is to be performed in order to generate the frames.

When the printout such as the printout in FIG. 20 is generated, the user can confirm that the colors of the points corresponding to A, B and C, which the user has selected, are the desired colors. If the frames are not the colors which are desired by the user, the user can repeat the point designation process.

Figure 21:
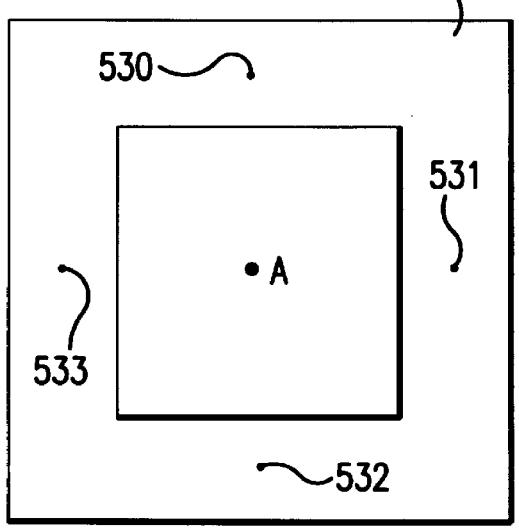
FIG. 21 illustrates four points on the frame drawn around a point, the four points read in order to accurately determine the color of the point A.

After the print-out illustrated in FIG. 20 is scanned, a plurality of points on the frame such as points 530, 531, 533 on the frame generator for point A illustrated in FIG. 21 are read and analyzed. By selecting a plurality of points on the frame, the signal-to-noise ratio is increased as it is more probable that the colors on the frame are the true colors of the point A because the point A might be small whereas the width of the frame can be larger than a single point, thus giving a larger area which can be analyzed.

The points 530, 531, 532 and 533 illustrated in FIG. 21 are analyzed in order to determine the exact colors defining the point. When the colors of these points deviate the expected result by more than an allowable range, it can be determined that the image data was not properly red or input and a warning for urging the user to execute the scanning again or repeat the process can be displayed. When the image data at the paint portions on the frame is properly read or input, the RGB data is smoothed by the RGB filter 6. Next, since this RGB data is compared with the previous RGB data and the parameters of the CMYK γ correction unit 12 are corrected based on the result of the comparison, the color balance is adjusted to accurately reproduce the colors at the desired points selected by the user.

The present invention allows the colors to be accurately calibrated based on the colors which have been selected by the user and not based on all colors within the document. Thus, a load imposed on the processing system is reduced along with the time needed to perform the color balance adjustment being reduced. Although the color balance has been described as being adjusted by changing the CMYK γ correction parameters, the present invention is not limited to this but color correction can be performed by adjusting the parameters of the RGB to CMYK color converter 509 or the RGB γ compensator 507 or using any desired manner of adjusting the color output. While the original image which has been input by the present invention has been described as analyzing one point which has been selected by the user, it is possible to further improve the signal-to-noise ratio by averaging the RGB data at a plurality of points surrounding the points selected by the user. The third embodiment has been described as generating a frame of colors surrounding the selected point, although other shapes of color generated by a paint processing can be utilized by the invention. When a plurality of desired points close to each other are selected by the user, the frames generated around these points may overlap, causing colors to be mixed in the frames which are to be analyzed. This problem can be solved by changing the size and configuration of the paint processing, giving priority to one of the selected points, or by moving one of the frames so that there is no overlap.

In the present invention, if the coordinates of the points which are selected by the user are input in advance before the original document is scanned, the original document can be scanned to analyze only the selected coordinates. Further, as explained above, it is possible only to output the selected frames of color without outputting the entire image. Further, it is also possible to read or scan and then print the entire image or document and then read or input only the desired portions from the image data, or first read or input data from the entire document, extract and print only the portions of the selected regions and then read data only from the selected regions.

The fourth embodiment of the invention corrects colors contained within an image supplied by a user or input in some other manner. As in the third embodiment, the fourth embodiment does not analyze every color contained within the image but analyzes only a limited number of colors. In the third embodiment of the invention, the user selected specific points within an image which were to be used for the color calibration process. In the fourth embodiment of the invention, it is not necessary for the user to designate specific points for which the color balancing operation is performed, although it is possible for the user to designate a region of an image for which color balancing is to be performed.

Figure 22:
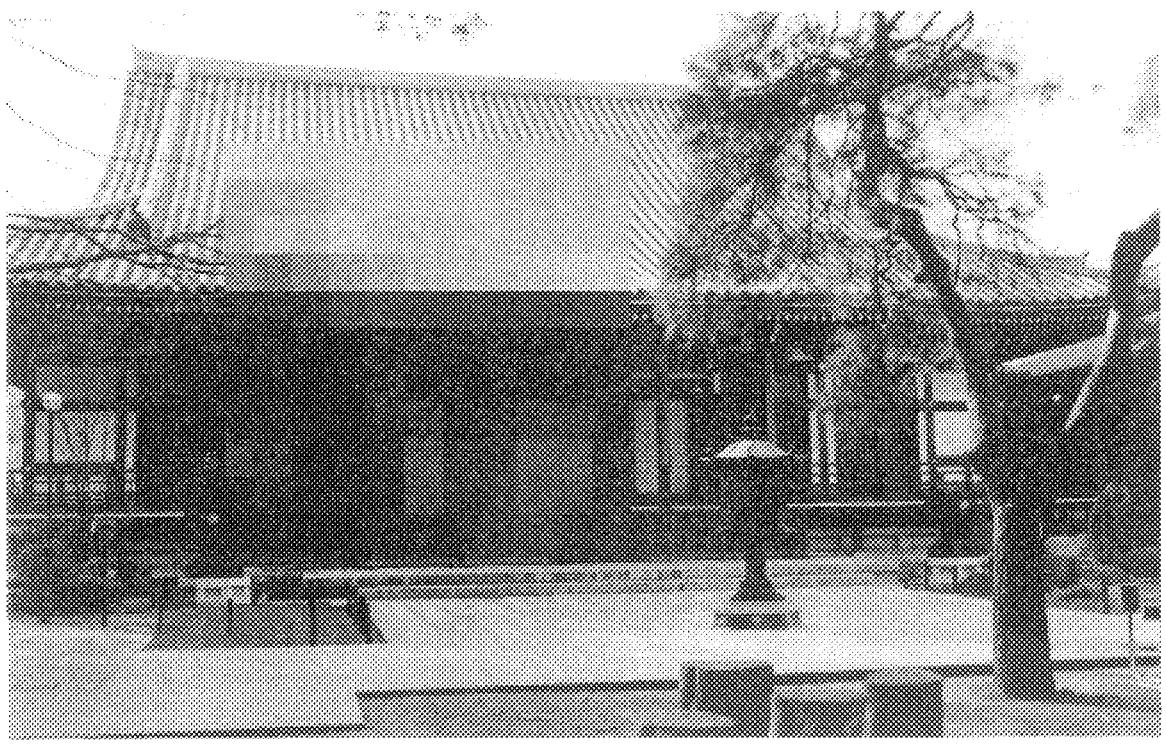
FIG. 22 illustrates a portion of the image illustrated in FIG. 1 which is converted to a mosaic format.
Figure 23:
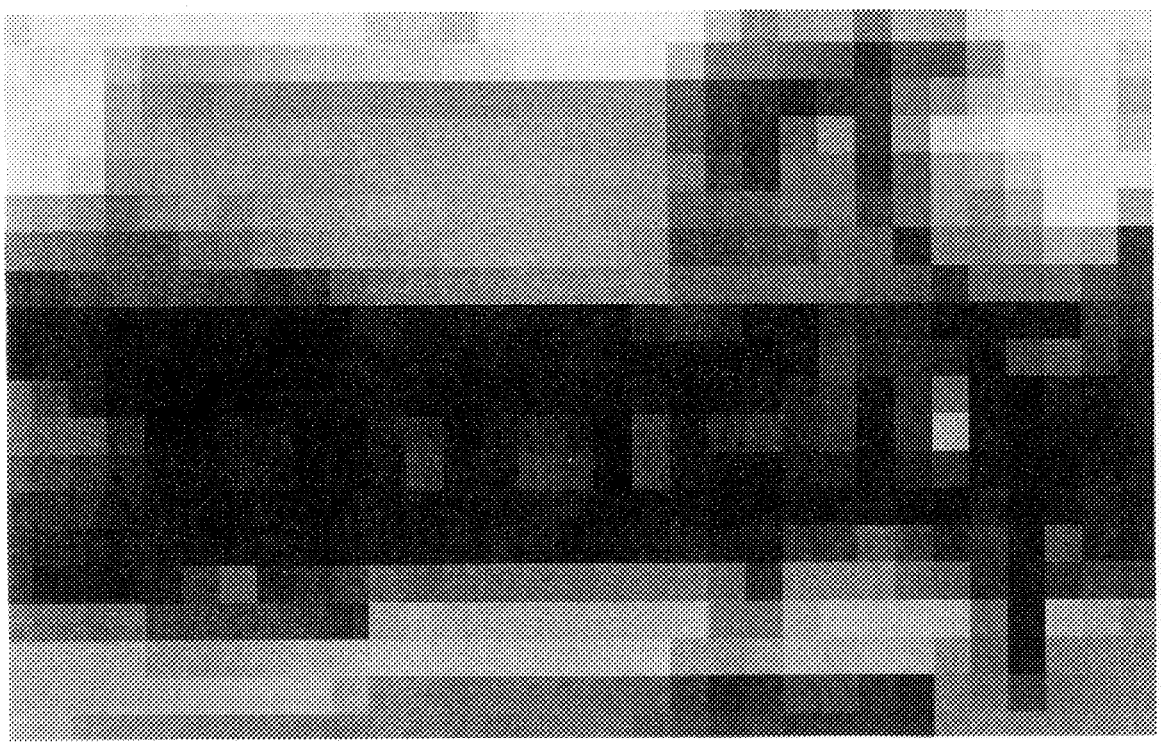
FIG. 23 illustrates the entire image illustrated in FIG. 1 converted to a mosaic format.

Broadly speaking, the fourth embodiment of the invention samples either a portion or all of an image and generates a series of color patterns or patches based on the sampled points. In the preferred embodiment of the invention, the sampled points are utilized to generate a mosaic-type pattern as illustrated in a control portion of FIG. 22. In FIG. 22, it can be seen that a plurality of small squares are made of a single color. The color within the squares is generated by sampling a single point within the region defined by the square. For example, the upper left-hand portion of a section of the original image can be sampled or read, a central portion can be sampled, or if desired, an average color within a region may be sampled. FIG. 23 illustrates the entire image of FIG. 1 which has been generated using mosaic processing.

An advantage of using mosaic processing is that while a very large number of colors may be necessary to represent the image illustrated in FIG. 1, it may be difficult to perform a color balancing or calibration operation for every color contained in FIG. 1. By sampling and calibrating for a limited number of colors within the figure, processing time may be reduced. Further, by increasing the size of specific color regions, the signal-to-noise ratio for smaller color sections is improved.

Figure 24:
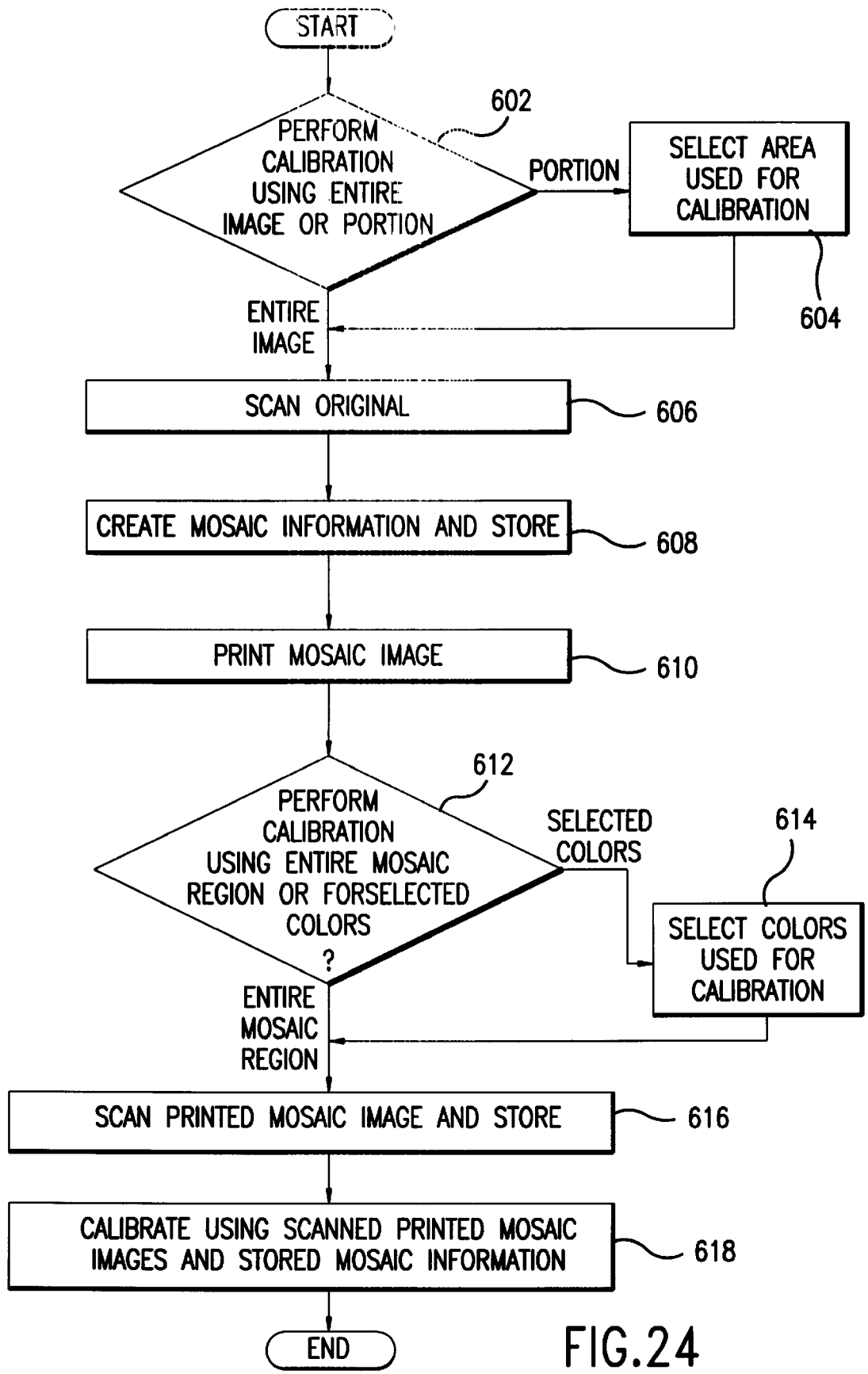
FIG. 24 is a flowchart for explaining the fourth embodiment of the invention which adjusts the color balance using mosaic processing.

FIG. 24 is a flowchart for performing a color calibration operation by sampling a limited number of points within an image. By sampling actual points within the image, the colors output by the image processing device when making copies can be accurate for the colors actually utilized within the image. In FIG. 24, after starting, step 602 queries whether calibration is to be performed using the entire image as illustrated in FIG. 23, or only a portion of the image as illustrated in FIG. 22. If the user desires to perform calibration over a limited area of an image, the user in step 604 designates a specific area to be utilized for calibration. This limited area can alternatively be automatically selected or when the limited area is defined by a user, the user can define two opposite corners within a rectangular area for the region desired to be used for calibration.

In step 606, the original image, such as the image illustrated in FIG. 1, is scanned. Step 608 samples representative points of the scanned image, for example to create mosaic information which is subsequently stored. The mosaic image or sampled colors are then printed, for example as illustrated in FIGS. 22 or 23. Alternatively, the color information which has been sampled can be printed in an order based on the colors contained within the sampled points.

Step 612 then determines if the color calibration is performed using the entire mosaic region or for only selected colors. If the user desires calibration to be performed only for selected colors, these colors are selected by the user in step 614. If the user desires to perform calibration for the entire mosaic region, no further input is necessary. Flow then proceeds to step 616 which instructs the user to place the image containing the mosaic or printed colors which have been sampled on the scanner, the image is then scanned and the color information stored. Last, the color calibration operation is performed in 618 which compares the color of the printed mosaic images scanned in step 616 with the color information which was stored in step 608 in a color balancing or adjusting process which is performed in a similar manner as the color calibration was performed in the third embodiment of the invention which generates selected regions of color using frame painting. The process of FIG. 24 then ends.

The hardware used by the fourth embodiment of the invention is the same as the hardware used by the third embodiment of the invention and is illustrated in FIGS. 18 and 4. The functions of the elements in FIG. 18 are the same for both the third and fourth embodiments and a description of these elements will not be repeated. The special effects processor 518 is the element which performs the sampling of colors in order to create the mosaic patterns, also refereed to as color patch image data. The colors contained within the individual blocks of the mosaic patterns are stored in the color memory 519. If a specific area is to be designated, this is performed utilizing the area signal generator 518.

In order to generate the mosaic patterns, the settings used to generate the mosaic are based on the reading accuracy, size of the image, memory capabilities, and processing speed of the image processing device. When the patterns used to generate the mosaic are square, it is preferable to make the size of the square at least one centimeter in size, although the size can vary in accordance with the user's desires and capabilities of the machine. The use of mosaic processing to generate color patch image data is conventional but the use of generated color patches from mosaic processing has not been previously utilized to perform a color calibration operation.

As in the third embodiment, the color calibration process can be performed by adjusting the γ curve of a look-up table used for CMYK γ correction, and the correction of this γ curve is easily realized by generating a new γ curve by an arithmetic process, or by selecting one of a plurality of γ curves prepared in advance. Alternatively, the color balance can be regulated or adjusted by adjusting the color correction index or parameters controlling the conversion process of converting the colors from RGB to CMYK or by adjusting the RGB γ correction.

As an alternative to the above embodiment, it is also possible to create a histogram of the colors contained within an image and to compare image data of only a portion or a limited number color patches in which the hues are distinctive, or when a specific color appears over a predetermined area such as an area larger or smaller than a given size.

When the color patches are arranged and printed in order corresponding to the tone of color, as opposed to corresponding to the sampled position within the original image, a user is easily able to find a desired color. Therefore, a user can select specific color patches within the mosaic in an easy manner in order to perform color calibration for a limited number of colors of the image, as opposed to performing the color calibration for all colors contained within the mosaic pattern.

Figure 25:
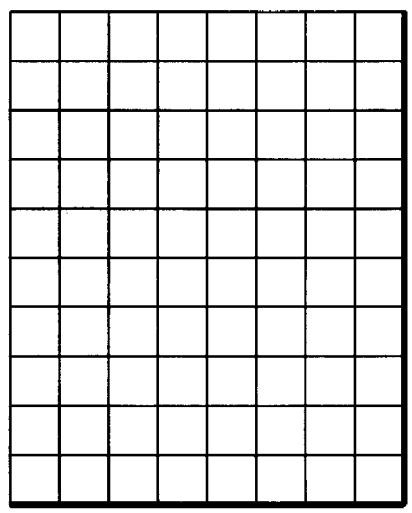
FIG. 25 illustrates in simplified form an image which has been broken into a plurality of sections.
Figure 26:
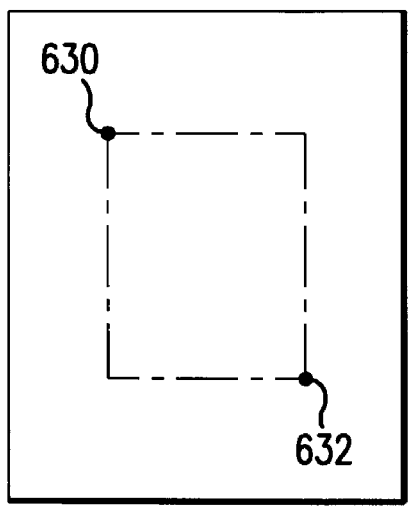
FIG. 26 illustrates a central portion of an image defined by two points.
Figure 27:
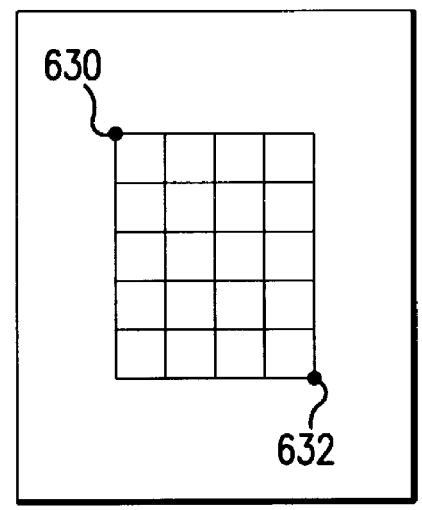
FIG. 27 illustrates a mosaic pattern created using the image which is in the region defined in FIG. 26.

FIG. 25 illustrates a simplified version of a color patch pattern generated using the present invention. Each block contained within FIG. 25 will have a single color contained therein, in a similar manner as illustrated in FIG. 23. If a user desires to have a limited region within an image have calibration performed thereon, the user can designate two points such as points 630 and 632 illustrated in FIG. 26. In this manner, the mosaic processing will be performed only for the portion of image defined by this region, as is illustrated in FIG. 27. It is to be noted that the points 630 and 632 which have been illustrated in the figures are not necessarily drawn to scale and in fact, can simply be part of a line, or not actually displayed. As seen in FIG. 22, when the mosaic processing is performed on a limited area of an image, it is possible to print out in non-mosaic form (i.e., ordinary form) the image portion which is not mosaic processed. This allows the user to more easily recognize the different areas of the image, including the areas within the mosaic section. As an example, without presenting FIG. 23 in a proper orientation to a user, it might be difficult for the user to detect the correspondence between FIG. 23 and FIG. 1, whereas it is quite easy for a user to determine the correspondence between the mosaic colors in FIG. 22 and FIG. 1.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. For example, the different features disclosed in the various embodiments may be applied to any of the other embodiments, even if not expressly stated. For example, steps 490, 494, and 496 which determine how close the colors to be calibrated are to the original format and the displaying of a warning described in the third embodiment can be applied to the fourth embodiment illustrate din FIG. 24. Further, other features and advantages of the different embodiments are applicable to the various embodiments. It is therefore to be understood that within the scope of the appended claims, the invention may be practiced otherwise than as specifically described herein.

What is claimed as new and desired to be secured by Letters Patent of the United States is:

1. A method for adjusting a color balance of an image processing device, comprising the steps of:
    performing a color calibration of the image processing device;
    setting a standard color balance based on results of the color calibration;
    printing a plurality of images having different color balances which are changed with respect to the standard color balance;
    selecting, by a user, a color balance of one of the plurality of images to be used by the image processing device.

2. A method according to claim 1, further comprising the step of:
    manually adjusting the color balance to be different from the standard color balance after the standard color balance is set and before printing out a plurality of images.

3. A method according to claim 1, wherein the step of printing the plurality of images comprises:
    printing the plurality of images along with an indication of how a color balance of each of the plurality of images is changed, relative to the standard color balance.

4. A method according to claim 3, wherein the step of printing the plurality of images further comprises:
    printing the plurality of images to each have a corresponding identification,
    wherein the selecting step comprises:
    selecting one of the identifications in order to select the color balance.

5. A method according to claim 1, further comprising the step of:
    printing subsequent images by the image processing device using the color balance which has been selected.

6. A method according to claim 1, wherein the step of performing the color calibration comprises:
    printing test images;
    scanning the printed test images; and
    determining a color balance by comparing image data from the test images which have been scanned with stored color information.

7. A method according to claim 1, wherein the step of selecting the color balance comprises:
    adjusting at least one of a gamma compensation and parameters controlling a red-green-blue to cyan-yellow-magenta conversion process of the image processing device.

8. A method according to claim 1, wherein the step of printing a plurality of images comprises:
    printing a plurality of images of equal size.

9. A method according to claim 1, wherein the step of printing a plurality of images comprises:
    printing a plurality of images which have been magnified.

10. A method according to claim 1, further comprising the step of:
    scanning an original image,
    wherein the step of printing a plurality of images comprises:
    printing a plurality of images which include a portion from the original image which has been scanned.

11. A method for adjusting a color balance of an image processing device, comprising the steps of:
    placing a sheet having a plurality of densities of black on a scanner;
    scanning the sheet;
    comparing color image data from the sheet which has been scanned with information which has been previously stored;
    adjusting parameters controlling a processing of RGB color data using a result of the comparing step.

12. A method according to claim 11, further comprising the step of:
    generating the sheet having the plurality of densities, before the scanning step.

13. A method according to claim 11, wherein the adjusting step comprises:

adjusting parameters controlling a RGB gamma compensation process.

14. A method for adjusting a color balance in an image processing device, comprising the steps of:

scanning an original document;

storing color information of at least one point of the original document;

printing a page including a region of color corresponding to a color of the at least one point which is printed to have a different size and shape of the at least one point of the original document;

scanning the page which has been printed;

comparing the color information which has been stored of the at least one point with color information from the page which has been printed and scanned; and adjusting color processing parameters using a result of the comparing step.

15. A method according to claim 14, further comprising the step of:

selecting, by a user, the at least one point of the document, wherein the printing step comprises:

printing the region of color as a frame which surrounds a location of the at least one point of the document.

16. A method according to claim 15, wherein:

the storing step comprises storing color information of a plurality of points, the printing step comprising printing a plurality of regions of color having shape of a frame, each corresponding to a color of one of the plurality of selected points, each of the plurality of regions being printed to have a different size and shape of the corresponding point of the original document, and the comparing step compares the color information which has been stored of the plurality of points with color information of the page which has been printed.

17. A method according to claim 14, wherein the comparing step comprises:

comparing the color information which has been stored with color information which is obtained using a plurality of points of the region of color on the page which has been printed and scanned.

18. A method according to claim 14, further comprising the step of:

displaying a warning message indicating the step of scanning the page which has been printed is erroneous when the step of comparing determines that the color information of the at least one point is not similar to the color information from the page which has been printed and scanned.

19. A method according to claim 14, wherein:

the selecting step comprises selecting a plurality of points, and the printing step comprises printing a plurality of regions of color in rectangular shapes.

20. A method according to claim 19, wherein the selecting step further comprises:

selecting the plurality of points without a user choosing the plurality of points.

21. A method according to claim 19, wherein the printing step comprises:

printing the plurality of regions of color in square shapes.

22. A method according to claim 19, wherein the printing step comprises:

printing the rectangular shapes in positions corresponding to the positions of the selected points.

23. A method according to claim 19, wherein the printing step comprises:

printing the rectangular shapes in an order determined by a color of the rectangular shapes.

24. A method according to claim 19, further comprising the step of:

designating a region of the scanned image to be sampled, wherein:

the selecting step comprises selecting a plurality of points within the region which has been designated, and the printing step comprises printing the plurality of regions of color in a mosaic pattern.

25. A method according to claim 19, wherein:

the selecting step comprises selecting a plurality of points, and the printing step comprises printing the plurality of regions of color in a mosaic pattern.

26. A system for adjusting a color balance of an image processing device, comprising:

means for performing a color calibration of the image processing device;

means for setting a standard color balance based on results of the color calibration;

a printer for printing a plurality of images having different color balances which are changed with respect to the standard color balance;

means for selecting, by a user, a color balance of one of the plurality of images to be used by the image processing device.

27. A system according to claim 26, further comprising:

means for manually adjusting the color balance to be different from the standard color balance after the standard color balance is set and before printing out a plurality of images.

28. A system according to claim 26, wherein:

the printer is further for printing the plurality of images along with an indication of how a color balance of each of the plurality of images is changed, relative to the standard color balance.

29. A system according to claim 28, wherein the printer comprises:

means for printing the plurality of images to each have a corresponding identification, wherein the means for selecting comprises:

means for selecting one of the identifications in order to select the color balance.

30. A system according to claim 26, further comprising:

means for printing subsequent images by the image processing device using the color balance which has been selected.

31. A system according to claim 26, wherein the means for performing the color calibration comprises:

means for printing test images;

means for scanning the printed test images; and means for determining a color balance by comparing image data from the test images which have been scanned with stored color information.

32. A system according to claim 26, wherein the means for selecting the color balance comprises:

means for adjusting at least one of a gamma compensation and parameters controlling a red-green-blue to cyanyellow-magenta conversion process of the image processing device.

33. A system according to claim 26, wherein the printer for printing a plurality of images comprises:
means for printing a plurality of images of equal size.

34. A system according to claim 26, wherein the printer for printing a plurality of images comprises:
means for printing a plurality of images which have been magnified.

35. A system according to claim 26, further comprising:
means for scanning an original image,
wherein the printer for printing a plurality of images comprises:
means for printing a plurality of images which include a portion from the original image which has been scanned.

36. A system for adjusting a color balance of an image processing device, comprising:
means for scanning a sheet having a plurality of densities of black;
means for comparing color image data for the sheet which has been scanned with information which has been previously stored;
means for adjusting parameters controlling a processing of RGB color data using a result of a comparing performed by the means for comparing.

37. A system according to claim 36, further comprising:
means for generating the sheet having the plurality of densities.

38. A system according to claim 36, wherein the means for adjusting comprises:
means for adjusting parameters controlling a RGB gamma compensation process.

39. A system for adjusting a color balance in an image processing device, comprising:
means for scanning an original document;
means for storing color information of at least one point of the original document;
a printer for printing a page including a region of color corresponding to a color of the at least one point which is printed to have a different size and shape of the at least one point of the original document;
means for scanning the page which has been printed;
means for comparing the color information which has been stored of the at least one point with color information from the page which has been printed and scanned and generated an output using a result of the comparing; and
means for adjusting color processing parameters using the output from the means for comparing.

40. A system according to claim 39, further comprising:
means for selecting, by a user, the at least one point of the document,
wherein the printing comprises:
means for printing the region of color as a frame which surrounds a location of the at least one point of the document.

41. A system according to claim 40, wherein:
the means for storing comprises means for storing color information of a plurality of points,
the printer comprises means for printing a plurality of regions of color having a shape of a frame, each corresponding to a color of one of the plurality of selected points, each of the plurality of regions being printed to have a different size and shape of the corresponding point of the original document, and
the means for comparing comprises means for comparing the color information which has been stored of the plurality of points with color information of the page which has been printed.

42. A system according to claim 39, wherein the means for comparing comprises:
means for comparing the color information which has been stored with color information which is obtained using a plurality of points of the region of color on the page which has been printed and scanned.

43. A system according to claim 39, further comprising:
a display for displaying a warming message indicating the a scanning of the page which has been printed is erroneous when the means for comparing determines that the color information of the at least one point is not similar to the color information from the page which has been printed and scanned.

44. A system according to claim 39, wherein:
the means for selecting comprises means for selecting a plurality of points, and
the printer comprises means for printing a plurality of regions of color in rectangular shapes.

45. A system according to claim 44, wherein the means for selecting further comprises:
means for selecting the plurality of points without a user choosing the plurality of points.

46. A system according to claim 44, wherein the printer further comprises:
means for printing the plurality of regions of color in square shapes.

47. A system according to claim 44, wherein the printer further comprises:
means for printing the rectangular shapes in positions corresponding to the positions of the selected points.

48. A system according to claim 44, wherein the printer further comprises:
means for printing the rectangular shapes in an order determined by a color of the rectangular shapes.

49. A system according to claim 44, further comprising:
designating a region of the scanned image to be sampled, wherein:
the means for selecting comprises means for selecting a plurality of points within the region which has been designated, and
the printing step comprises printing the plurality of regions of color in a mosaic pattern.

50. A system according to claim 44, wherein:
the means for selecting comprises means for selecting a plurality of points, and
the printer comprises means for printing the plurality of regions of color in a mosaic pattern.

* * * * *